United States Patent [19]
Moisan et al.

[11] Patent Number: 6,087,663
[45] Date of Patent: Jul. 11, 2000

[54] SEGMENTED SCINTILLATION DETECTOR FOR ENCODING THE COORDINATES OF PHOTON INTERACTIONS

[75] Inventors: Christian Moisan, Vancouver, Canada; Mark S. Andreaco, Knoxville, Tenn.; Sebastian Paquet, Montreal Nord; Joel G. Rogers, Vancouver, both of Canada

[73] Assignee: Triumf, Vancouver, Canada

[21] Appl. No.: 09/018,949

[22] Filed: Feb. 5, 1998

Related U.S. Application Data

[60] Provisional application No. 60/037,519, Feb. 10, 1997, and provisional application No. 60/042,002, Apr. 16, 1997.

[51] Int. Cl.$^7$ .................................................... G01T 1/202
[52] U.S. Cl. ........................................... 250/367; 250/368
[58] Field of Search .................................... 250/367, 368, 250/266

[56] References Cited

U.S. PATENT DOCUMENTS

| | | | |
|---|---|---|---|
| 4,638,158 | 1/1987 | Sonne et al. | 250/266 |
| 4,750,972 | 6/1988 | Casey et al. | |
| 4,823,016 | 4/1989 | Yamashita et al. | 250/363.03 |
| 4,843,245 | 6/1989 | Lecomte | |
| 5,122,667 | 6/1992 | Thompson et al. | |
| 5,349,191 | 9/1994 | Rogers | |

FOREIGN PATENT DOCUMENTS

| | | | |
|---|---|---|---|
| 58-106482 | 6/1983 | Japan | 250/367 |

*Primary Examiner*—Constantine Hannaher
*Attorney, Agent, or Firm*—Griffin, Butler, Whisenhunt & Szipl, LLP

[57] ABSTRACT

Light guides (1) capable of encoding the transverse and longitudinal coordinates of light emission induced by the interaction of photons in an array of a plurality of the light guides. Each light guide has at least two discrete crystal segments (4) adjacently disposed along a common longitudinal axis of the light guide (1). Between adjacent segments is a boundary layer (7) having less light transmission than the light transmission of the crystal segments (4). A light absorbing mask (8) increases light adsorption in a segment (4). Photons enter the light guide (1) and cause the emission of scintillation light which is delivered in different and resolvable quantities to light sensing devices. The differences in quantity of delivered light is caused by successive decreases in light in part by the boundary layers (7). The differences in quantity of light establish the segment from which the light emission took place.

27 Claims, 15 Drawing Sheets

SEGMENTED SCINTILLATION DETECTOR FOR ENCODING THE COORDINATES OF PHOTON INTERACTIONS

This application claims the benefit of U.S. Provisional Application Ser. No. 60/037,519, filed on Feb. 10, 1997, and U.S. Provisional Application Ser. No. 60/042,002, filed on Apr. 16, 1997.

The present invention relates to an apparatus capable of determining the transverse and longitudinal coordinates of light emission induced by the interaction of photons in an array of photon detectors having a plurality of scintillation light guides.

BACKGROUND OF THE INVENTION

Apparatus for detecting the distribution of photons, e.g. of gamma ray or X-ray with no restriction as to their specific energies, transmitted or emitted through objects to study the compositions or functions of the objects are well known to the art. As an example, the technique referred to as Positron Emission Tomography (PET) can study, in vivo, biochemical functions, on the injection of tracer molecules which emit positrons in a living body. Shortly after the release of the positrons in the subject body, the positrons annihilate with surrounding electrons to produce a pair of photons, each having 511 keV of energy, and traveling in nearly opposite directions. The detection of a pair of such annihilation photons by two opposed detectors allows for the determination of the location and direction in space of a trajectory line defined by the opposite trajectories of the photons. By using a further technique, known to the art as tomographic reconstruction, to superpose the many trajectory lines obtained by surrounding the subject with an array of detectors, an image of the distribution of tracer molecules in the body can be produced.

A central feature of such apparatus is the photon detector. The latter must be capable of providing accurate estimates of the coordinates of photon detection as well as of the energy and time of arrival of each incident photon. Precise position, energy and time information is necessary to reconstruct an accurate image of the distribution of positron emitting molecules and enable such in vivo functional studies.

Several photon detectors capable of providing accurate estimates of the energy, transverse coordinates and time of photon interactions are known to the art. A notable example, of such a photon detector and apparatus for use thereof is disclosed in U.S. Pat. No. 4,750,972 to Casey et al., the disclosure of which is incorporated herein by reference and relied upon. A crystal compound termed a scintillator is generally used in fabricating detectors for the above application. A scintillator (the compound) has the unique property of emitting light upon excitation at the location of the interaction of a photon in the scintillator. A state-of-the-art photon detector takes the form of a block of scintillator compound formed into a plurality of right rectangular crystals with typical dimensions of 4×4×30 mm and arrayed at known transverse (X and Y) locations. The array is produced by either gluing side-by-side individual scintillator crystals to a support or by cutting slots in a solid piece of scintillator crystal along the direction perpendicular to a photon receiving end. Photons enter the block through the receiving end, formed by the top transverse tips of the crystals. The photons will penetrate a volume of the block over a finite distance before interacting with the scintillator. This distance varies statistically for every photon according to a known exponential distribution which depends on the type of scintillator compound used as well as the energy of the incident photons. Upon an interaction, the scintillator compound is excited and emits a quantity of light in proportion to the energy lost by the photon. The receiving end and side walls of every scintillator crystal are coated by a highly reflective compound that will trap that light in the volume of the crystal in which the interaction occurred. The crystal functions as a light guide for the emitted light, channeling the light, through multiple reflections on the coated side-walls, toward a light transmitting end of the crystal. An appropriate number of light sensing devices are optically coupled to the light transmitting ends of an array of crystals to collect the light from all crystals in the array. With proper calibration methods, the collected light allows determination of how much energy was released by the photon in interacting with the scintillator, to register the interaction in time and most importantly to locate the particular crystal which was excited by the interaction.

Since conventional detectors can only locate the interactions of photons within the total volume of a crystal, state-of-the-art detectors are said to be two-dimensional, i.e. an array of crystals provides only information as to the transverse coordinates, X and Y, of the photon interaction and leaves undetermined the position of the interaction along the longitudinal Z-axis of the excited crystal. The longitudinal coordinate can be safely omitted in imaging situations where the photon impinges at the normal angle to the receiving end of the crystal. In that case, the photon will penetrate in a direction parallel to the longitudinal axis of the crystal and interact in the volume of that crystal. Knowledge of the transverse coordinates (X and Y coordinates) of a pair of photons detected in coincidence is then sufficient to unambiguously determine the orientation and location in space of their trajectory line. In contrast, a photon which is incident along a direction that makes a significant angle with respect to the normal angle of the crystals arranged to form a detector may travel across several crystals of an array of crystals forming the detector before interacting. As it is not known through which of the crystals the photons truly entered the array of crystals forming the detector, knowledge alone of the transverse coordinates of the interactions of photons detected in coincidence is not sufficient. It leaves a significant uncertainty as to the orientation and location in space of their trajectory line.

The above-discussed uncertainty gives rise to decided difficulties. For example, the position resolution of a PET device is generally specified as the measured spatial size of the projected image of a point-like source emitting coincident photons. Misidentification of the crystal of incidence due to the deep penetration of photons impinging at an angle on the detectors formed by the array of crystals, leads to a degradation of the image resolution of conventional PET cameras that is well known to the art as the parallax error. The parallax error causes the image resolution to be significantly worsened for an emitting source of photons located at the edge of the camera than for a source located at its center. As a result, the parallax error limits the capacity of conventional cameras to image relatively large objects, e.g. a human torso. The problem hence becomes more prominent when imaging extended bodies or when attempting to bring the detectors closer to the imaged body.

It would, of course, be desirable to obviate the parallax error in PET cameras by use of detectors that can measure not only the transverse, but also the longitudinal coordinates of the photon interactions. Indeed, knowledge of the three-dimensional coordinates of the interactions of a pair of photons detected in coincidence, leaves no ambiguity as to their trajectory lines.

A recent approach in the art directed to the location of the X, Y and Z coordinates of light emissions in an array of crystals is disclosed in U.S. Pat. No. 5,349,191 to Rogers, which is incorporated herein by reference and relied upon for disclosure. The Rogers approach is that of a surface on at least a portion of the crystal walls having high light reflectivity and crystal cross-sectional dimensions such that the total fraction of the emitted light guided to the light sensing devices is substantially less for interactions occurring close to the receiving end of the crystal and substantially more for those occurring close to the light transmitting end. However, this approach leads to a continuous variation of the total collected light with the longitudinal (Z-direction) coordinate of emission. This variation must therefore be calibrated at a plurality of locations from the receiving end to the light transmitting end of the crystal. The calibration involves measurements of the collected light as a function of the known longitudinal coordinate of a collimated beam of photons impinging on a side face of every detector. While the Rogers detector provides accurate X, Y and Z positions of a point of a photon-induced light emission in a pattern of a plurality of scintillating crystal light guides, that detector does require the above calibration, which is inconvenient and can be time consuming, especially with a large number of crystals.

Another approach in the prior art for providing X, Y and Z positions of photon-induced light emissions in the crystals is disclosed in U.S. Pat. No. 4,843,245 to Lecomte. That approach uses the stacking of two segmented scintillator crystals that have different scintillation decay times. As the approach relies on the availability of scintillators that have different decay times, it is practically difficult to extend this approach to more than two segments. Moreover, this would inevitably require relatively slow scintillators and likely compromise the maximum speed at which photons can be detected. Indeed, to provide a range of decay times, succeeding scintillators must be of slower speeds, and for a reasonable resolution, the last segment must be at a significantly reduced speed. As a result, the overall speed of a detector in Lecomte's approach can be no greater than the lowest speed of a segment.

U.S. Pat. No. 5,122,667 to Thompson uses a single crystal, which avoids the difficulties of the Lecomte approach, but relies on an absorbing band located at the median interaction coordinate along the longitudinal axis of the crystal. This light absorbing band divides the crystal into two regions such that a photon is equally likely to interact with the crystal in front of or behind the band. Thus, coincident events involving a pair of these crystal will divide into four equi-probable groups. The Thompson approach is said to be an improvement over the prior art approach where detector crystals are made of different segmented scintillators glued together. Thompson points out that using a segmented crystal of different materials in the segments will result in reduced efficiency if the overall crystal depth is constant, or decreased resolution and blurring, if the crystals are made deeper to retain efficiency.

Accordingly, a significant advantage in the art would follow from determining the transverse and longitudinal coordinates of photon interactions in a detector formed by crystals made of the same material. A photon detector providing this additional information requires only a straightforward calibration and allows for the correction of the parallax error affecting the current generation of PET cameras.

SUMMARY OF THE INVENTION

The primary object of the invention is to provide an improved scintillator crystal and apparatus for use thereof which can determine with accuracy the transverse and longitudinal coordinates of photon interactions in scintillator crystals.

The present improved scintillator crystal is an improvement over state-of-the-art detectors where each scintillator crystal serves as a light guide to transmit light released upon excitation by interacting photons. In the apparatus, a number of light sensing devices are optically coupled to the light transmitting end of the crystal array to collect that light. In the prior art, with the exception noted above, the crystal light guides are monolithic (are not segmented and made of the same material) and present uniform characteristics through their entire volume and particularly through their entire length. In these prior art unsegmented light guides, the probability of the emitted light reaching the light sensing devices is governed by two basic phenomena, namely: the absorption of light in the bulk of each crystal, or the escape or absorption of light in interactions with the surfaces of the ends or side walls of the crystal. In the prior art, the scintillator compound and its surface finish and coating are chosen to minimize, as much as possible, the occurrence of these two phenomena.

Contrary to the prior art, the present invention is based on the discovery that a discrete stepwise variation of the amount of collected light can be effected by a segmented scintillation crystal, which discrete stepwise variation depends on the longitudinal coordinate of the photon interaction. This variation can be exploited in a detector having a plurality of such segmented crystals to obtain not only the transverse but also the longitudinal coordinates of photon interactions and, thus, among others, avoids the parallax error in PET.

As a first embodiment of the invention, a discrete variation of the collected light is enabled by segmenting the crystal along its longitudinal axis so that each crystal is formed of discrete and distinct crystal segments of the same or substantially the same scintillating compound. A boundary layer that suppresses light transmission is disposed between adjacent segments. The boundary layer effects a stepwise variation of the light collected by the light sensing devices. Suppression of light transmission between any two adjacent crystal segments can be further controlled by the composition of the boundary layer and by the end configurations of adjacent segments.

The crystal may be segmented either mechanically or chemically. Thus, in one embodiment of mechanical segmentation, adjacent crystal segments are mechanically held together, e.g. by glues or mechanical holders, and the boundary layer utilizes a difference between the index of refraction of the scintillator material of the segments and the index of refraction of the boundary layer. Provided it is always different than that of the scintillator, this index of refraction can be the same for all segments or it can also vary from one segment to another. By virtue of the well known Fresnel's equations, the greater the difference between these indices of refraction, the greater the total internal reflection of the light when it reaches the boundary layer between the two adjacent segments.

In another embodiment of the invention, the crystal can be segmented chemically, to alter selected properties of the crystal at a boundary layer, by the addition of specific dopants using techniques well known to the art. For example, and not as a restriction, the most common method for growing crystals of high melting-point oxide materials such as lutetium oxyorthosilicate (LSO), described in C. L. Melcher, et al., "Cerium-doped Lutetium Oxyorthosilicate:

A Fast, Efficient, New Scintillator, IEEE Trans. Nucl. Sci., NS-39, 502, (1992), is the Czochralski technique in which a seed crystal is used to pull a single crystal boule from a melt. In the particular case of cerium-doped LSO, the cerium concentration in the raw materials, i.e. the melt, can be varied for example from 0.05% to 2.0% (at relative % to lutetium) to produce boundary layers in the LSO crystals which causes the emitting of significantly different amounts of light when excited by photons of a given energy.

Controllably suppressing the transmission of the emitted light between segments of the crystal effectively enhances the amount of the emitted light to be trapped in the volume of a segment before it can reach the light sensing devices. The light that is trapped in a segment has a higher chance of being absorbed in the bulk of the crystal of that segment, or on the surface of the outer walls of the crystal segment or on a light adsorbing mask disposed at ends of a segment (described hereinafter). For a given longitudinal location of emission, the fraction of the original light that will survive that trapping and reach the light sensing devices is affected by the total number of segments between the point of emission of the light and the light transmitting end. The net effect of suppressing the transmission at the boundary layers between segments is therefore incremental from one segment to another. This leads to discrete (not continuous) differences in the amount of collected light for emission points located in distinct segments of the segmented crystal. The amount of light does not change for different points of emission within a single segment.

Suppressing the light transmission from each segment may not be sufficient, alone, to assure discrete and resolved differences in the light collected from a crystal light guide. Practical limits are imposed on this separation by the bulk properties of the scintillator compound, by the length and transverse cross section of the segments, by the particular choice of the boundary layer, by the surface finish of the segments and by the reflective coating. Accordingly, an important feature of the invention is that discrete and resolved differences in the amount of collected light are improved by enhancing the absorption of trapped light in a segment.

Several different means may be used to achieve such enhanced absorption. In a first embodiment, part or all of the receiving end of a segmented crystal is covered with a light absorbing mask, replacing all or part of the reflective material normally covering that end. This results in the absorption of emitted light that reaches that end of the crystal stack of segments. The absorbing mask will eliminate a different fraction of the light depending on the segment in which the emission occurred. This amount depends on the number of boundary layers the light, originating from a given segment, must cross to reach the receiving end of the crystal stack with the mask thereon.

As another embodiment, the boundary layer may have controlled absorbency and thickness so as to enhance such absorption and resolve differences in the amount of light collected from interactions located in each segment. This further accentuates the loss of light at each segment by eliminating a sufficient fraction of the emitted light which travels through each segment on its path to the light sensing devices.

An important feature of the invention is the ability to use only one type of scintillator compound and with no particular restriction as to which specific scintillator compound must be used. The scintillator has the same or substantially the same physical properties for each segment of the crystal.

The total height of a crystal is dictated by a need to achieve good detection efficiency for photons interacting with the compound used in a particular scintillator and may easily vary from 15 to 50 mm. As a further feature of the invention, that total height of the crystal can be segmented according to two different patterns. In the first pattern, referred to as "equal count rate" (ECR) segmentation, the height of each segment is chosen in accordance with the exponential attenuation of photons of known energy in the scintillator so as to result in an equal probability for these to interact in any segment of the crystal. In the second pattern, each segment of the crystal has substantially the same or the same height. This has the obvious merit of its ease of implementation, and this pattern is referred to as "equal thickness" (ET) segmentation. Although the ECR and ET segmentations are preferred, it is understood that other longitudinal segmentation patterns may be used.

Thus and in contrast to the prior art, the present invention provides a crystal light guide that is made of at least, but preferably more than, two segments of crystals of the same scintillator compound to form a crystal segmented along its longitudinal axis. There are discrete and resolvable (detectable) differences in the amount of light, originating from any segment of the crystal, reaching the light transmitting end of the crystal and being recorded by the light sensing devices. These differences result entirely or in part from the boundary layer located at the interfaces between any two adjacent segments of the crystal. As that absorption in discrete steps depends on the crystal segment from which the light emission occurred, the amount of collected light provides a self-calibrating and observable longitudinal coordinate of the photon interaction in a particular segment that produced the light.

Thus, briefly stated, the present invention provides a scintillating light guide for determining the X, Y and Z positions of a point of photon-induced light emission. The light guide comprises a plurality of discrete crystal segments made of substantially the same scintillating compound with each segment being adjacently disposed along a common longitudinal axis of the light guide. A boundary layer is disposed between at least two adjacent crystal segments with the boundary layer having a light transmission loss such that emissions from a segment of the light guide can be distinguished.

These light guides are used in an apparatus for determining the X, Y and Z positions of a point of photon-induced light emissions in an array of a plurality of the scintillating light guides made of a scintillating compound. The apparatus is, in part, conventional and comprises the novel light guides described above, at least one photodetector disposed in register with a light transmitting end of each light guide and an analyzer for analyzing from signals produced by the photodetector the X and Y coordinates of photon-induced light emissions within the array of light guides. In the present apparatus, the analyzer is, in part, a discriminator which compares light values received by the photodetector to determine which crystal segment of the light guide emitted the photon-induced light and thus determining a Z coordinate thereof.

BRIEF DESCRIPTION OF THE DRAWINGS

The invention will now be described with reference to the accompanying drawings of which.

DESCRIPTION OF PREFERRED EMBODIMENTS

As noted above, the present invention is directed to detectors for determining the X, Y and Z positions of photon-induced light in a segmented crystal detector. While the invention is, thus, applicable to any photon-induced light emission, for sale of conciseness herein, the invention will be largely described in connection with a preferred embodiment where the photon is a gamma ray, but it is to be understood that the invention is not limited to this embodiment.

The boundary layer between segments of a crystal may be introduced into the crystal either mechanically, e.g. by adhering together cut segments of the crystal with a glue which performs a boundary layer function, or chemically, e.g. by the addition of dopant and selection of their concentration into the crystal. The method selected will depend on both the physical properties of the scintillator selected and the application for which it is intended. The boundary layer functions in essentially the same manner, whether chemically or mechanically formed. Accordingly, the invention will be discussed hereinafter in connection with the mechanically formed boundary layer, for conciseness, but it is to be understood that the invention is equally applicable to a chemically formed boundary layer.

Figure 1A:
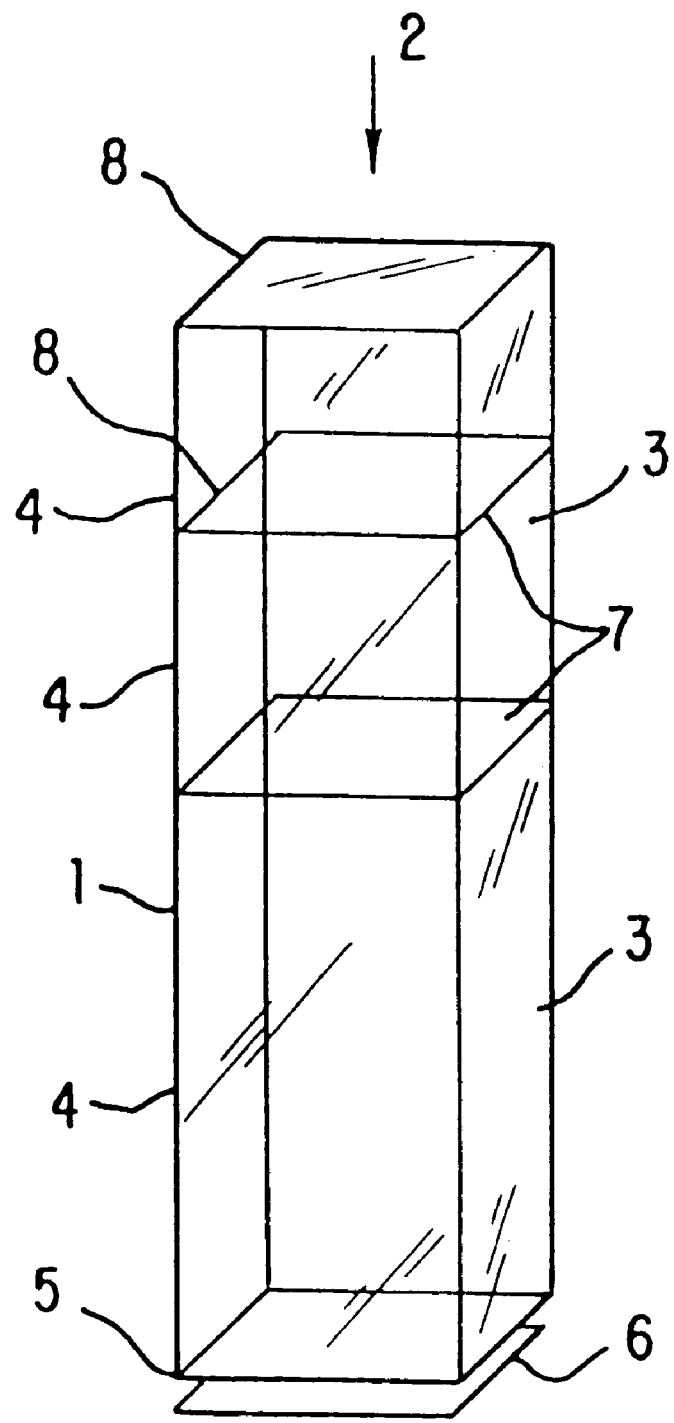
FIG. 1(a) is a schematic isometric view illustrating a segmented gamma ray crystal light guide composed of three cerium-doped lutetium oxyorthosilicate (LSO) crystals of heights following an ECR segmentation.
Figure 1B:
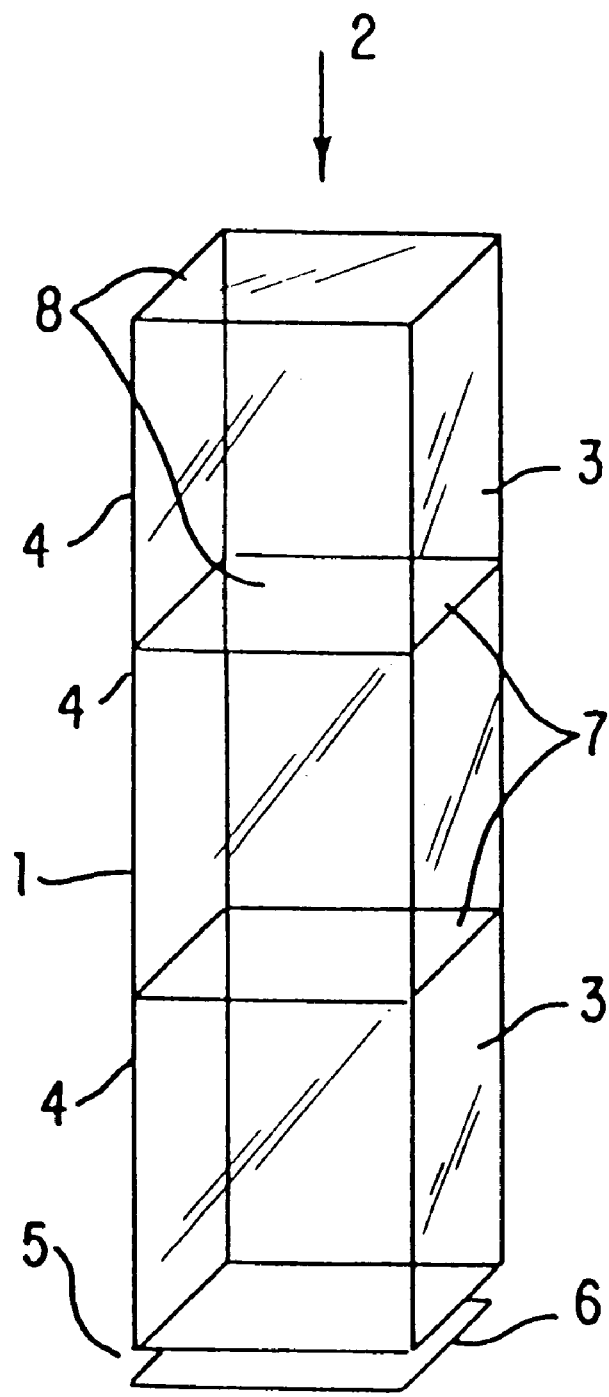
FIG. 1(b) is a schematic isometric view illustrating an alternate embodiment of a segmented crystal light guide following an ET segmentation.

In the mechanically formed boundary layer embodiment, the segmented crystal is prepared by cutting a monolithic crystal into desired segment lengths along the longitudinal direction and then forming a stack of the cut segments with the boundary layer being between adjacent segments to provide a crystal stack light guide. FIGS. 1(a) and 1(b) show two embodiments of such crystal stack light guide. The light guide, generally 1, is preferably in the form of a right rectangular prism of 20 to 50 mm height and 2 to 16 $mm^2$ transverse cross-section. The choice of both the transverse cross-section and height of the light guide will depend on its effective atomic number, the application for which the detector is intended and the energy domain of the photons considered. It is formed by optically coupling at least, but generally more than, two crystal segments of the same or substantially the same scintillator compound. The chosen scintillator has the same or substantially the same chemical and physical properties for each crystal segment of the stack (allowing for normal manufacturing and raw material purity tolerances) and may be any scintillator compound. In the particular application of the invention to PET, the scintillator is preferably cerium doped lutetium oxyorthosilicate (LSO). Compared to bismuth germinate (BGO), widely used in the prior art, the new LSO offers, as disclosed in C. L. Melcher, et al., cited hereinbefore, high detection efficiency, high scintillation light yield and short scintillation decay time, which properties make it a significantly better scintillator for photon detection, especially for the detection of 511 keV gamma rays.

The gamma rays enter the crystal light guide 1 through the gamma ray receiving end 2, or generally from that direction, and have interactions which excite the scintillator and cause the emission of light in close proportion of the energy deposited by the interacting gamma rays. All surfaces 3 of all crystal segments 4 are preferably polished or etched or coated in the manner known to the art. The side walls are preferably covered by a white coating that reflects the light that would otherwise escape via refraction. The light transmitting end 5 of the crystal stack light guide 1 is optically coupled to at least one light sensing device 6 which collects the emitted light and converts it to a proportional electric signal that can be further processed using means well known to the art.

FIG. 1(a) shows an embodiment of a crystal stack with three crystal segments following an ECR segmentation.

The height of each segment is chosen in accordance with the exponential attenuation of gamma rays of given energy, e.g. 511 keV for PET, in the scintillator so as to result in an equal probability for these to interact in any segment of the stack. FIG. 1(b) shows an embodiment with the alternate ET segmentation.

Individual crystal segments 4 of a stacked light guide are optically coupled by a boundary layer 7 that has less light transmission than the crystal segments 4, e.g. achieved by an index of refraction significantly different from that of the chosen scintillator crystals. When the boundary layer is formed by a different index of refraction, the index of refraction may be less than or greater than the index of refraction of the crystal segments. It is preferred that the index of refraction be less than the index of refraction of the crystals. Each such boundary layer, thus, serves as a mean to suppress the transmission of emitted light between adjacent crystal segments.

Also provided is a means to enhance the absorption of a fraction of the emitted light which finds either the receiving end 2 or the boundary layer 7 between the two upper most crystal segments of the stack on its optical path. In one embodiment, this means is a light absorbing mask 8 which covers part or all of the receiving end 2 of the crystal stack.

This mask can be, for example, glue, grease, paint, etching or any material that results in light absorption that is quantitatively different than the reflector covering the remainder of the receiving end 2 to adsorb or partially absorb light from the internal reflections of light which takes place and which would otherwise increase the effectiveness of the light guide.

The light absorbing mask 8 may simply be a light absorbing paint, lacquer, plastic film, or the like, painted or adhered directly to the receiving end 2 of the light guide 1, or it may be black tape, such as ordinary electricians tape, or active or passive semi-conducting material, adhered to that receiving end 2, and the drawings show a tape.

However, other means may be used to enhance the absorption of emitted light which travels to the receiving end 2, e.g. roughening of the surface of the receiving end 2, scoring of that surface, sandblasting of that surface, etc., thus forming a mask 8, but the mask 8 is preferably a coating, film or tape, as described above.

As seen in FIG. 1(a), such an absorbing material, i.e. mask 8, may also be used at or in or as part of the boundary layer 7 between the two uppermost crystal segments of the light guide as is indicated in FIG. 1(a). Any means of providing an absorbing characteristic at that boundary layer, such as noted above, may be used. Indeed, such a mask 8 may be used between any two crystal segments of the light guide, but more usually, such a mask 8 will be used between the two uppermost crystal segments. The purpose of the mask between crystal segments is that of providing means to absorb emitted light which is reflected into a segment by the boundary layer. For example, when using a boundary layer that relies on a different index of refraction between the scintillator and the boundary layer itself and which is a relatively clear material, e.g. a glue, for fine tuning the light guide, it may be desirable to include a light adsorbing mask 8 at or in or as part of that boundary layer to absorb reflected light. The mask, in this case, may, for example, be either a material which only partially absorbs the light and is essentially totally disposed over the entire interface between crystal segments, e.g. a lightly tinted plastic film, or a material which is essentially opaque to light (high absorber) but which is only partially disposed over the interface between crystal segments, e.g. a strip or dot or square pattern of black paint which covers only a part of that interface. In other cases of fine tuning, instead of the mask being used, the boundary layer itself may have adsorbing material therein, e.g. a clear glue compounded with sufficient carbon black to achieve both the loss of transmitted light for boundary layer purposes and the adsorption of light for the mask purposes.

While the boundary layer 7 between crystal segments 4 may simply be a glue, the boundary layer can be anything which will provide a significant loss of light transmission between adjacent crystal segments. Thus, the boundary layer may be simply a spacing apart of the crystal segments such that there is an air gap therebetween, a liquid or a solid which abuts one of the faces of adjacent crystal segments, or even a vacuum therebetween. Each of these will form a different index of refraction and cause loss of light transmission. The particular material of the boundary layer is not critical.

Figure 2:
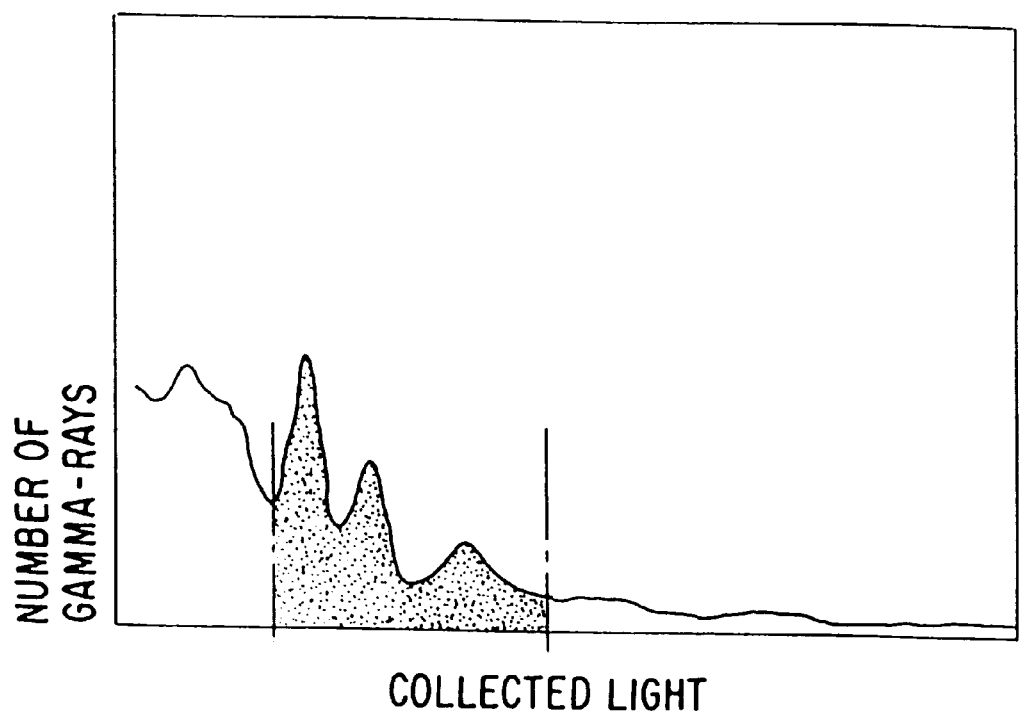
FIG. 2 shows the distribution of collected light with the embodiment of FIG. 1(a) when subject to 511 keV gamma rays incident through the receiving end of the crystal segment.

The variations in the amount of collected light from distinct crystal segments must not only be discrete but also, most importantly, be resolved. To be resolved, the discrete variations in the collected light must be more than the statistical fluctuations in the amount of light that reaches the transmitting end in order to generate a useful signal in the light sensing devices. These statistical fluctuations are quantified by the full-width-at-half-maximum (FWHM) of the peaks observed in the collected light distribution, such as that shown in FIG. 2. Thus, the boundary layer must assure a separation of the peaks in the collected light distribution which is at least equal to half the sum of their respective FWHMs, so that the peaks can be distinguished (resolved) from one another. To achieve this separation of peaks, the boundary layer must transmit less light than the light transmitted by the crystal segments and that difference in light transmission must be significant so that the peaks can be distinguished. What is significant will depend on the variables of the particular scintillator compound, the geometry of the light guide, the number of crystal segments, reflectivity and/or absorption of walls of the crystal segments, the use or non-use of mask 8, the sensitivity of the apparatus used to generate a histogram of the peaks, and, importantly, the light transmission properties of the boundary layer. Thus, that required significant loss of transmission of light through the boundary layer must be experimentally determined for each desired combination of the foregoing variables. If a histogram, such as shown in FIG. 2, does not adequately distinguish (resolve) the peaks, e.g. by at least an amount equal to half the sum of the respective FWHMs, as discussed above, then the light transmission through the boundary layer must be further reduced, or the other above variable changed, until the peaks are resolvable.

Thus, in summary, the boundary layer must have a light transmission loss which is resolvably significant, i.e. such that light emission from different segments of the light guide can be distinguished. In addition to the foregoing, each scintillator compound has a different intrinsic fractional energy resolution and that resolution varies with the energy level of the photon, e.g. gamma ray, which excites the compound. For example, at an energy level of 511 keV, sodium iodide scintillator compounds can have a resolution of about 7%. Thus, the net loss of light effected by the boundary layer must be greater than the intrinsic fractional energy resolution of the scintillator compound chosen for the crystal segments and, in the case of sodium iodide, would have to be greater than 7%. How much greater that loss of light must be depends on the variables discussed above and the particular scintillator compound. However, for specific combinations of the variables discussed above, although the net loss of light effected by a boundary layer is at least equal to the intrinsic fractional energy resolution of the scintillator compound when measured with photons of a given energy, the loss of light through the boundary layer itself can be quite low and still result in resolvable peaks, especially when the mask 8 is present (see FIG. 2). A loss of light transmission of 1.2% is usually adequate for so-called "bright" crystal scintillators, e.g. LSO crystals (see Examples 1 and 2), but in the more general cases, when the mask function is fulfilled by the segment layer itself, the loss of light should be at least 7% and up to 30%. Here again, the above-noted experimentation must be conducted for the specific combination of scintillator compound and variables discussed above.

The difference in light transmission is most preferably achieved by the boundary layer providing a different index of refraction than the index of refraction of the crystal segments. This is because it is very easy to achieve such a different index of refraction of the boundary layer as compared to the index of refraction of the crystal segments and, as such, is the most preferred embodiment of the invention. Generally, the index of refraction of the boundary layer should be about at least 5%, e.g. at least 8% or 10%, different from the index of refraction of the scintillator compound, but more preferably about at least 12% and up to about 50%.

As examples of such boundary layer, that layer may be a liquid or solid or gas to provide the required difference in index of refraction and may or may not contain additional materials to enhance the reflectivity and/or light absorbency and/or the index of refraction of that liquid, gas or solid. Clear gelled water, e.g. K.Y.™ jelly, is essentially transparent but has a significantly different index of refraction as compared with the crystal and may be used as a boundary layer. On the other hand, petroleum jelly can be made translucent and provides both a significantly different index of refraction for the boundary function and some absorbency for the mask function. Further, for example, glues, e.g. epoxy glues, can be transparent or translucent but compounded with reflective solids, e.g. aluminum oxide, to provide both a different index of refraction and increased reflectivity. Yet further, as an example, such glues or jellies, or other materials, can be compounded with light absorbents, e.g. finely ground carbon particles or well-known soluble light absorbents, to provide the difference in index of refraction and absorbency. By choice of the boundary layer material, itself, the transparency or translucency thereof, the inclusion of absorbents and/or reflective materials, a wide range of abilities to trap the light in a segment and, hence, reduce the transmission of light through the boundary layer is provided. By tuning the trapping ability of the boundary layer with the particular scintillating compound of the crystal, the crystal geometry, the reflective coating and the mask, etc., it is easy to ensure that the amount of light received by the light sensing device can be distinguished (resolved) as to from which segment that light originated.

In FIG. 1(a), as a typical example, the total height of the light guide 1 will be approximately 20 mm, and the light guide is a rectangular prism with each side being about 2 mm. It will be noted from FIG. 1(a) that the lowermost segment has a larger height than the segment next thereto, and that segment has a larger height than the topmost segment, in keeping with the "equal count rate" segmentation, as noted above. On the other hand, it will be noted that in FIG. 1(b) each of the segments 4 has essentially the same height, in keeping with the "equal thickness" segmentation noted above. In FIG. 1(b), typically, the total height of the crystal light guide will be about 30 mm, the light guide will be in a rectangular prism form, each crystal segment 4 will be about 10 mm in height, and each crystal has a rectangular side wall of 4 mm.

Referring now to FIG. 2, there is shown a measurement (histogram) of the distribution of collected light obtained with gamma rays having an energy of 511 keV, normally impinging on the receiving end 2 or from that general direction of a crystal light guide 1 manufactured in accordance with the embodiment disclosed in FIG. 1(a). The collected light distribution shows three distinct peaks that are clearly separated (discrete and resolved) from one another by discrete steps along the Collected Light axis. Each peak is associated with the interactions of incident gamma rays in the volume of a particular segment of the crystal light guide. The lowest peak corresponds to the excitations, by the full incident gamma ray energy, of the uppermost crystal segment with respect to the light transmitting end 5. This data demonstrates the ability of the invention to provide a measurement of the longitudinal coordinate of gamma ray interactions. The segment in which a gamma ray interaction occurred is simply determined by identifying under which of these peaks falls the amount of light collected for a given gamma ray interaction.

Figure 3A:
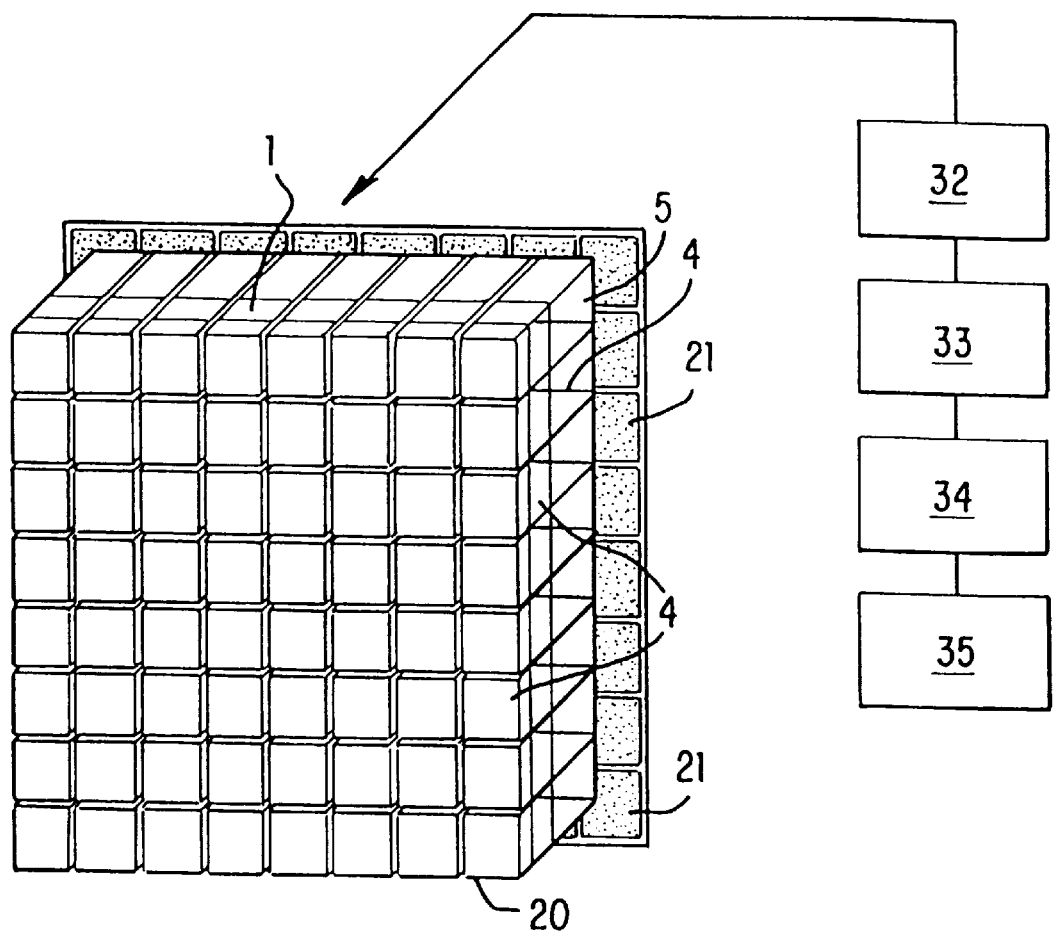
FIG. 3(a) shows an embodiment of a detector made of a plurality of segmented crystal light guides with ECR segmentation, each being coupled to an individual compact light sensing device.

FIGS. 3(a), (b), and (c) show three embodiments of a gamma ray detector made of a plurality of crystal segments stacked with ECR segmentation. Each embodiment can be distinguished by the nature, number and disposition of the light sensing devices collecting the emitted light.

FIG. 3(a), which is the most preferred embodiment, shows a gamma ray detector, generally 20, made of a plurality of crystal segments 4 stacked with an ECR segmentation into a light guide. The individual crystal light guides are closely packed and arrayed in a pattern having known X and Y locations (coordinates). The light transmitting end 5 of each crystal light guide is coupled to an individual solid state light sensing device 21. These are known high gain, low noise, semiconducting photo diodes optically coupled directly onto the light transmitting end 5 of the light guides 1. For compactness, the plurality of photo diodes necessary to sense each crystal light guide of the array is integrated onto a single matrix, whose X and Y pattern and transverse area closely match that of the array. Optionally, segments of optical fibers or the like can individually couple each light guide of the array to a corresponding unit of such a photo diode matrix which would have an X and Y pattern or surface area significantly different than those of the crystal stack array. For example, with such an optical fiber coupling of each light guide to a photodiode matrix, there is no need for that photodiode matrix to be in the same X-Y arrangement as that of the light guides, since the coupling of an optical fiber will be known from a certain light guide to a certain diode. Thus, the diodes may be in a linear configuration or a circular configuration or any other configuration which is more convenient for use with a particular apparatus.

As shown in FIG. 3(a) and which is common to all embodiments, there is provided an amplifier 32 for amplifying the signal generated by the collection of light in the individual photo diodes. Also provided is a discriminator 33, known to the art, to discriminate as to which of the photo diode elements collected a significant amount of light emitted upon the interaction of a gamma ray in the volume of a crystal light guide array. These known discriminators may be gate-type apparatus or simply part of a computer program used to analyze the received signals. As there is a one-to-one correspondence between a crystal light guide and a photo diode, this information provides the X and Y locations of the gamma ray interaction. Also is an adder 34, known to the art, to add the signals generated in all of the photo diode elements. The sum of these signal follows a distribution which will have the typical shape of that shown in FIG. 2 and allows, as discussed previously, to determine the longitudinal coordinate of the gamma ray interaction. A display device 35 may display these results.

Figure 3B:
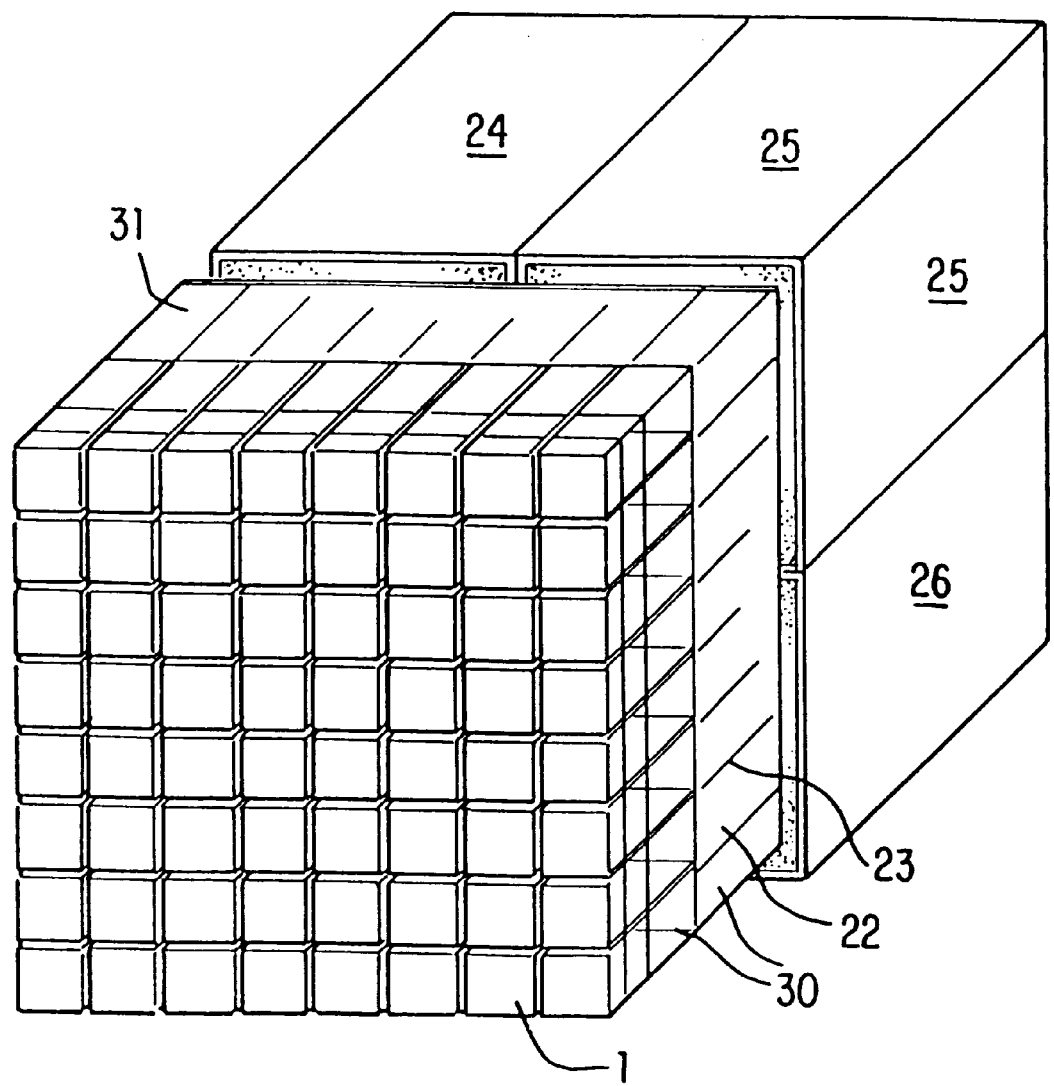
FIG. 3(b) shows another embodiment of a detector made of a plurality of segmented crystal light guides and optically coupled to a slotted light guide and four photomultiplier tubes, the centers of which approximately coincide with the centers of the quadrants of the crystal light guide array for compactness.

FIG. 3(b) shows an embodiment of a gamma ray detector made of a plurality of crystal light guides 1. A plurality of individual crystals light guides are closely packed and arrayed in a pattern having known X and Y positions and are coupled to a transmitting light guide 22. The transmitting light guide 22 can be made of the same scintillator compound chosen for the crystal light guide 1 or of a clear passive solid compound such as plastic or glass. It presents perpendicular slots 23, formed by saw cuts with the pitch and width matching those of the crystal light guides 1 of the array, and of which the purpose is to control the sharing of the light among one or more, e.g. four, light sensing devices, 24, 25 and 26 (the fourth sensing device is not shown) as depicted in FIG. 3(b) and to allow for the crystal identification, as disclosed in U.S. Pat. No. 4,750,972 to Casey et al. The saw cut slots 23 and side walls 30 of the transmitting light guides 22 present the same surface finish and highly reflective coat as the individual crystal light guides 1. The four light sensing devices, 24, 25 and 26 being shown, e.g. photomultiplier tubes, are optically coupled to a light transmitting end 31 of the slotted transmitting light guide 22. For compactness, the transverse area of the light sensing device is equal to or lower than a quarter of the total transverse area of the crystal light guide array. Their centers approximately coincide with the centers of the quadrants of the array.

Figure 3C:
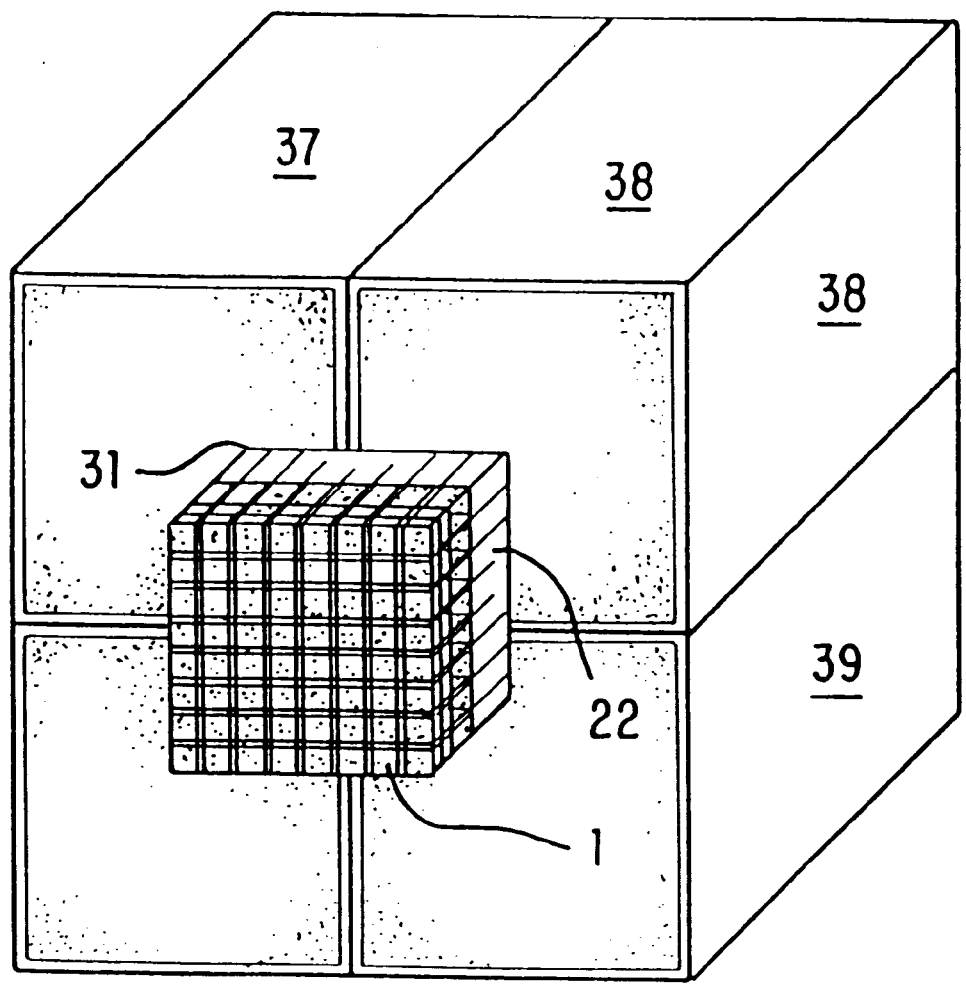
FIG. 3(c) shows a third embodiment of a detector made of a plurality of segmented crystal light guides and optically coupled to a slotted light guide and four photomultiplier tubes, the centers of which approximately coincide with the corners of the crystal array.

FIG. 3(c) shows a third embodiment of a gamma ray detector made of a plurality of crystal light guides 1 and a slotted transmitting light guide 22. However, in this embodiment the light transmitting ends 31 of the transmitting light guides 22 are optically coupled to four photomultiplier tubes, 37, 38 and 39 (the fourth tube is not shown in the drawings), the centers of which approximately coincide with the corners of the crystal light guide array. For photomultiplier tubes of a given area, this particular configuration, disclosed by W. H. Wong et al., in "An Analog Decoding BGO Block Detector Using Circular Photomultipliers", IEEE Trans. Nucl. Sci., NS-42, 1095, (1995), has the advantage of allowing for the identification of crystals in a transverse area roughly a factor four smaller than that achievable using the embodiment of FIG. 3(b).

Minor modifications to the embodiments, such as the use of photomultipliers with multiple or circular cathodes rather than those with a square cathode may be employed.

Figure 4A:
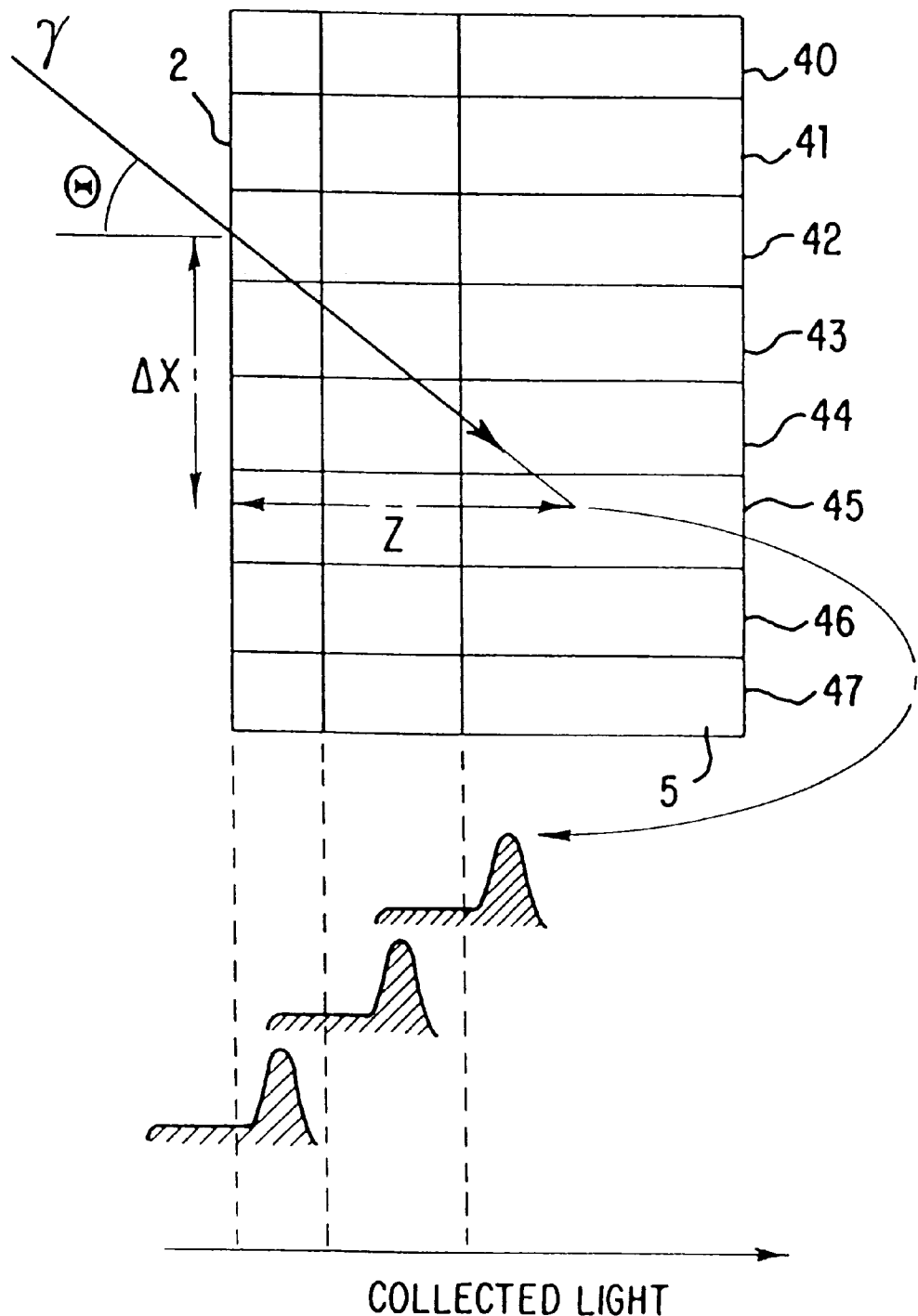
FIGS. 4(a) and 4(b) are schematic diagrams showing how the preset invention measures the longitudinal coordinate of gamma ray-induced emissions and corrects for the parallax error in a PET camera using detectors having a plurality of the present segmented crystal light guides.

Referring now to FIG. 4(a), there is shown a schematic diagram of the basic operation of a detector comprising a block having an array of a plurality of crystal light guides 40–47. A gamma ray (γ) impinges on the receiving end 2 of the detector, making an angle, Θ, with the normal. The gamma ray enters the volume of the detector through the tip of the crystal light guide number 42 and penetrates the volume to finally interact in a segment of crystal light guide number 45. The interaction excites the scintillator compound which emits light. A controlled fraction of the emitted light is guided in the Z-direction of light guide 45 to the light transmitting end 5 of the crystal array which is coupled, directly or through transmitting light guides, to light sensing devices, as described above. The distribution of the light, collected by the sensing devices, allows it first to identify in which crystal light guide the light emission was located (the X and Y coordinates). The total amount of collected light is then compared to the discriminator values set to coincide with the location of the valleys of a distribution similar to that shown in FIG. 2 and which is obtained through a previous calibration for every crystal light guide of the detector array. The comparison allows to identify the segment of the crystal light guide in which the interaction occurred by finding which of the discriminator values correlates with the total amount of collected light for that interaction (the Z coordinate). Since the invention does not provide any sensitivity within the volume of the identified segment, the "Z" coordinate of the interaction in that segment is arbitrarily located at the point of most probable interaction within the volume of the identified crystal segment. The transverse X and Y coordinates are chosen to coincide with those of the center of the tip of the identified crystal stack.

Figure 4B:
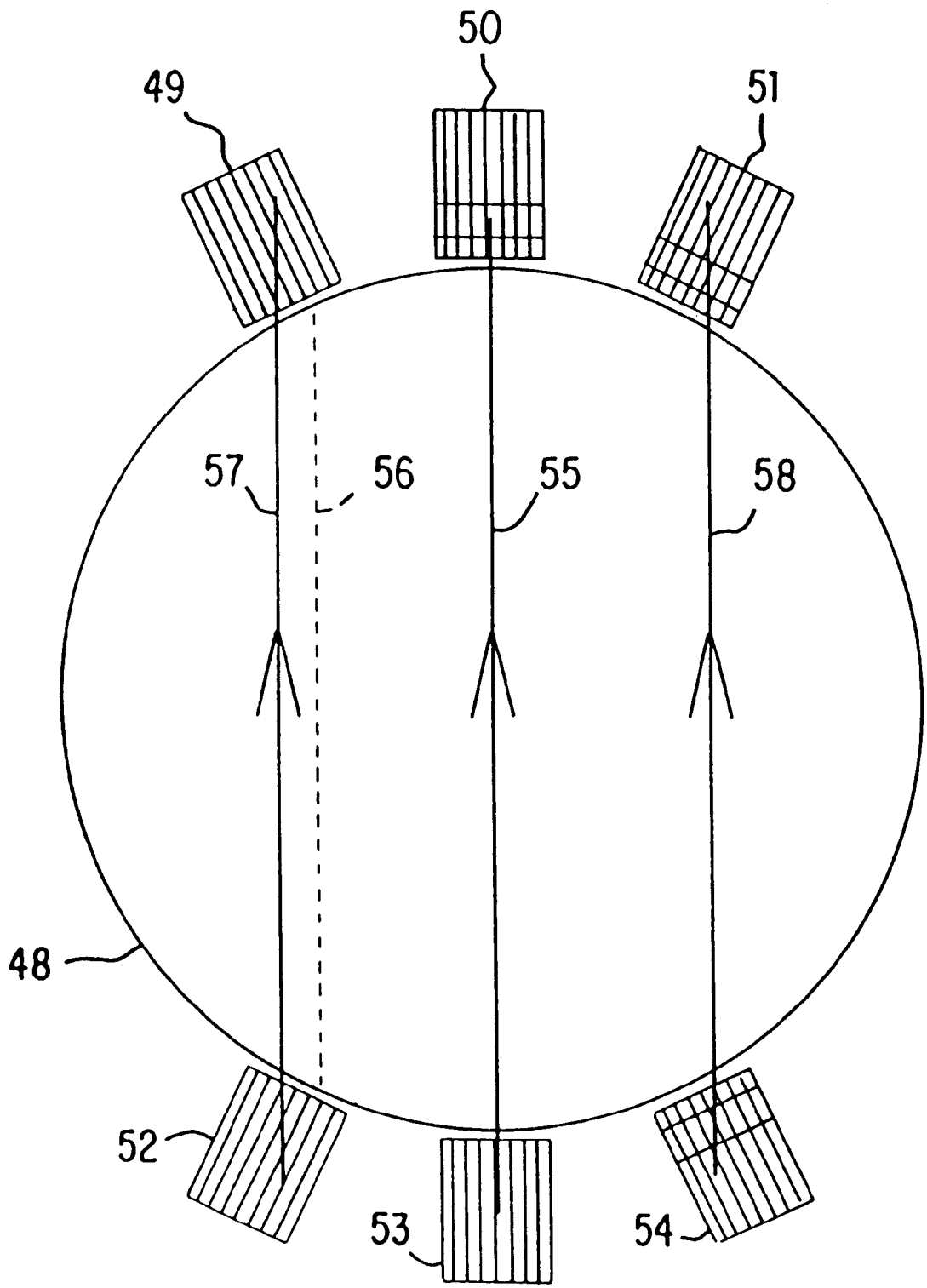

FIG. 4(b) shows the projection images which can be measured by moving a point source of positron emitting isotope along the horizontal radius of a circular PET camera gantry 48, and by observing the resulting number of coincident 511 keV gamma rays. The back-to-back trajectories of the coincident annihilation gamma rays define a line-of-response, whose intercept with the horizontal axis contributes to the projection image of the source. This intercept is in turn determined by the X and Y coordinates measured by the detectors 49–54 for each gamma ray of the pair. The detectors 50 and 53 are diametrically opposed on the camera gantry 48 and are sensitive to a source located at its center. The measurements of the X and Y coordinates are not significantly biased as the gamma rays travel in a direction 55 parallel to the long axis of the light guides 1 (enter the light guides at a substantially normal angle). They hence interact in the volume of the same crystal through which they entered the detector. The measured line-of-response for this pair of gamma rays coincides with their trajectory line. The width of the resulting projection image obtained for several such gamma ray pairs is then representative of the lower limit on the resolution of the camera.

The conventional detectors 49 and 52 at the left of the drawing are sensitive to a source offset from the center of the camera ring. Gamma rays impinge on these detectors at an angle, and have a significant chance to penetrate several light guides 1 before interacting. As the conventional detectors have no means to determine such angle of penetration, the X and Y coordinates of the light guide in which the interaction occurred are used to reconstruct the line of response 56. Due to the difference between the X and Y coordinates of the light guide of entrance of the gamma rays and the light guide of interaction of the gamma rays, the reconstructed line of response 56 is shifted inwardly from the true trajectory 57. It then follows that the projection image resulting from counting several such gamma ray pairs will be significantly broadened and skewed towards the center when compared to a projection image obtained with the source at the center of the camera. Moreover, the image will be closer to the center of the camera than the source really is. Such is the nature of the so-called parallax error.

In contrast, the present detectors 51 and 54 at the right of the drawing are made of a plurality of crystal segments and allow for the determination of the longitudinal coordinates of the interactions as shown in FIG. 4(a). The line-of-response 58 obtained by joining the X, Y and Z (longitudinal) coordinates measured for the interactions, coincides, this time, with the true trajectory of the gamma rays. The projection image resulting from counting several gamma ray pairs using the present crystal light guide detector will appear to be centered on the source location and most importantly to have a width much more narrow than that obtained using the conventional detectors 49 and 52.

Figure 5:
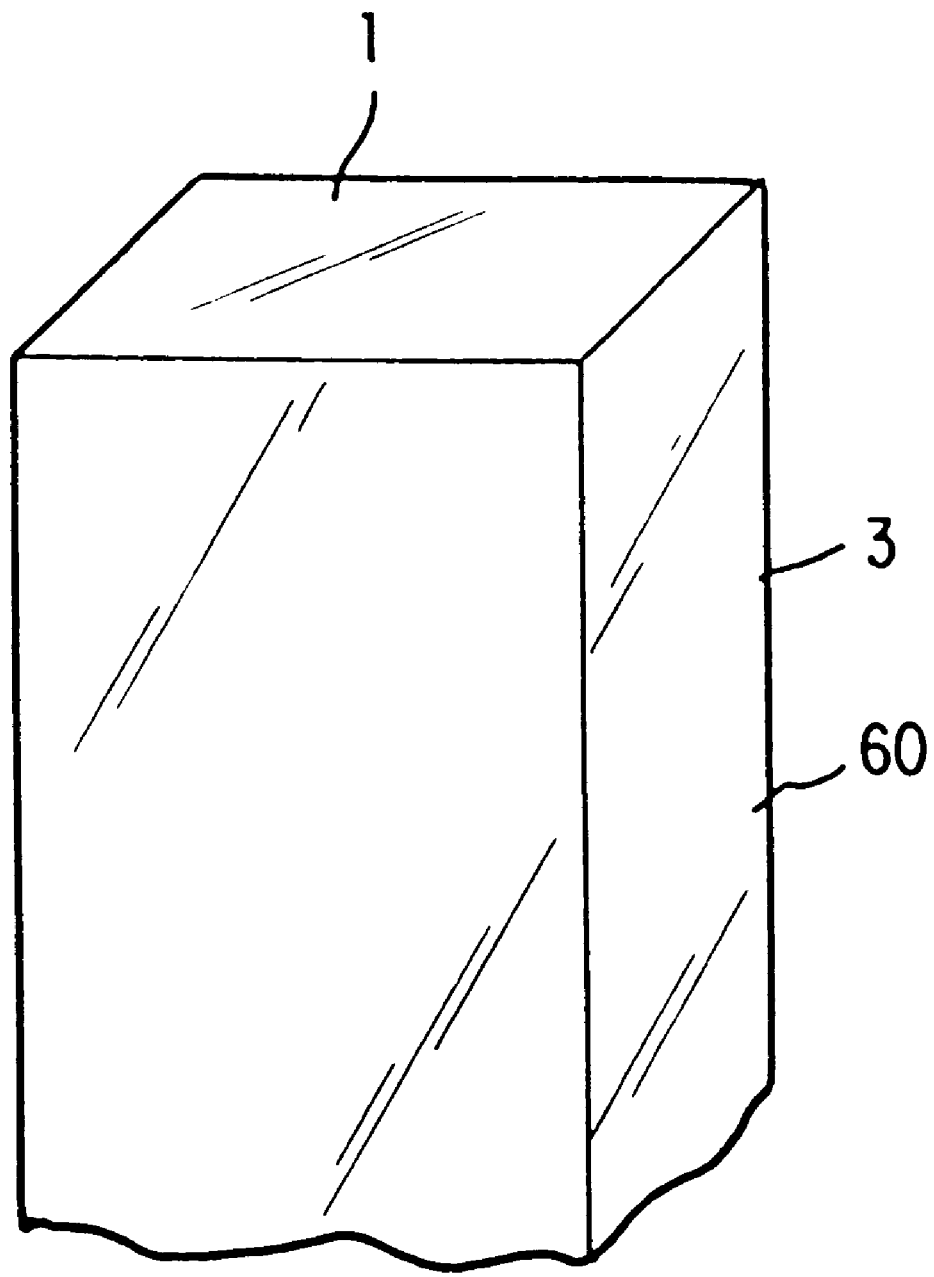
FIG. 5 is an isometric view of a portion of a light guide showing surface coatings thereon.

As noted above and as seen in FIG. 5, a light reflective surface 60 is disposed on at least a portion of the walls of segments 3 of each light guide 1. The light reflecting surface may be provided by those techniques common in the art, such as a highly polished outside surface, special surface treatments, including ion infusion, and the like, but, more preferably, a light reflecting coating or wrapping will be applied thereto.

In most conventional detectors, a reflective coating is prepared by suspending conventional highly reflective solids in a suitable organic carrier. The carrier may be any carrier which will hold those reflective solids to the walls of the light guides, but those carriers are, most generally, plastics, e.g. epoxy resins, polyester resins, silicone resins, etc., and especially clear epoxy resins. A number of high reflective solids are known to the art, e.g. magnesium oxide and magnesium carbonate, but, more usually, simply aluminum oxide in finely divided form is used for the reflective solids.

Normally, in order to make the coating as reflective as possible, the solids content of the aluminum oxide, or other reflective solid, is made as high as possible, e.g. at least 50%, and more usually at least 60% or 70%, or even greater. Other methods of applying reflecting surfaces on the light guides may also be used, such as spray painting or vacuum deposition, as well as special surface treatments, such as sanding or grinding the surface. Multiple wraps of Teflon (synthetic resinous fluourine) tape also serve as a very good coating. Any useful means of controlling and modifying the reflectivity of the walls of the light guides may be used.

As is conventional, one or a plurality of photodetectors, e.g. 4 or more photodetectors, are disposed in register with the light transmitting ends such that photon-induced light transmitted through transmitting ends is intercepted by the photodetectors. In one conventional embodiment, a first array of photodetectors, e.g. photodiodes, are disposed at one of the ends of the light guides and another or a second array of a plurality of photodetectors, e.g. photomultiplier tube(s), are disposed at the other of the ends of the light guides. The first array is used to determine the X-Y position of emitted gamma ray-induced light, and also may be used to perform the mask function, and the another or second array of photodetectors provide a timing pulse and energy discrimination (see, for example, Moses et al, "Performance of a PET Detector Module Utilizing an Array of Silicon Photodiodes to Identify the Crystal of Interaction", IEEE Transactions of Nuclear Science, Vol. 40, No. 4, August 1993).

In the present invention, these two different arrangements are possible, since, of course, gamma ray-induced light emission will travel toward both ends of the light guides, and, in that sense, either end or both ends may be the transmitting end. Thus, it really makes no difference, for X-Y position determinations, which of the ends of the light guides the detection of emitted light is made. However, for the Z position determination, the transmitting end is the end having the photodetectors used for determining the Z position, which may or may not be the same photodetectors for determining the X-Y position. In the preferred embodiment, the same photodetectors determine both the X-Y and Z positions.

As shown in FIG. 1(a), the light guides may have a generally rectangular cross-section, as is conventional in the art, but that cross-sectional configuration is not critical to the invention. The cross-sectional configuration may be oval or circular or triangular or any other cross-section, but for ease of manufacture by sawing slots into a block of the scintillator material, preferably, the light guides are rectangular in cross-section.

Also, as shown in FIG. 1(a), the photon receiving end 2, as well as the transmitting end 5, may be substantially planar, which is conventional in the art, but, here again, that is not critical to the invention. The photon receiving end can be convex or concave, e.g. any surface configuration which is consistent with accurately passing photons therethrough.

However, a preferred form of the invention, especially for ease of manufacture, is where the light guides 1 are formed in a scintillator block, with the light guides 1 extending less than a height of the block so as to provide a continuous light transmitting portion (transmitting light guide 22) of the block which is adjacent to the light transmitting ends of the light guides, although there may be a light transmitting portion at the receiving end 2 or at both ends. The size and shape of the transmitting light guides 22 are often carefully selected for the purpose of tuning the light distribution among the photodetectors, which in turn improves the X and Y position determination, as described in detail in U.S. Pat. No. 4,750,972. Alternatively, however, that transmitting light guide 22 may be separate from the scintillator block, e.g. a glass block or the like may form transmitting light guides 22. In any case, the transmitting light guides 22 are usually co-extensive with the X-Y dimensions of the scintillator block, or slightly oversized by up to about 10–20% of those dimensions, and the Z-direction dimension of the transmitting light guide 22, when present, is up to about 40% of the Z-direction dimension of the scintillating light guides.

In the preferred embodiments, the scintillating light guides 1 are generally uniform in cross-section and are rectangular in cross-section and are formed in a generally rectangular scintillator block with slits in the block extending from the receiving ends 2 to the light transmitting ends 5 so as to spatially separate the light guides so formed in the block. With this arrangement, it is very easy to apply a reflective coating on the walls (or otherwise provide the reflective surface as discussed above).

Figure 6A:
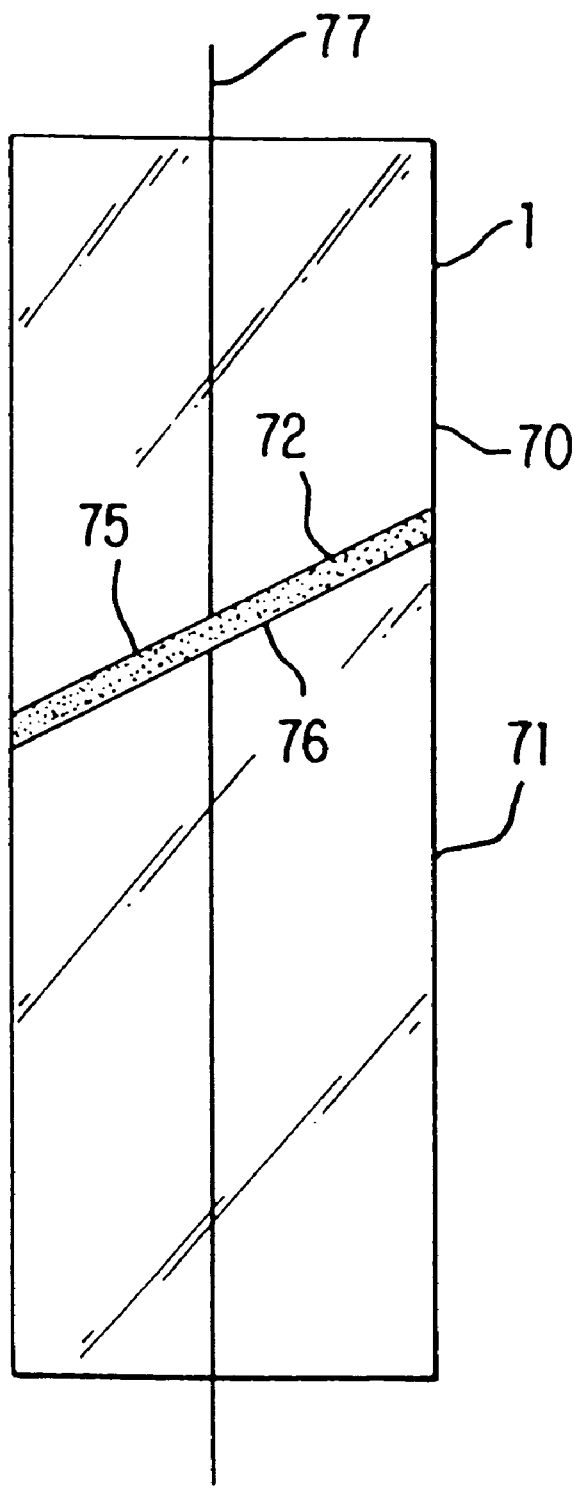
FIGS. 6(a) and 6(b) show different configurations of adjacent ends of adjacent segments of a light guide.
Figure 6B:
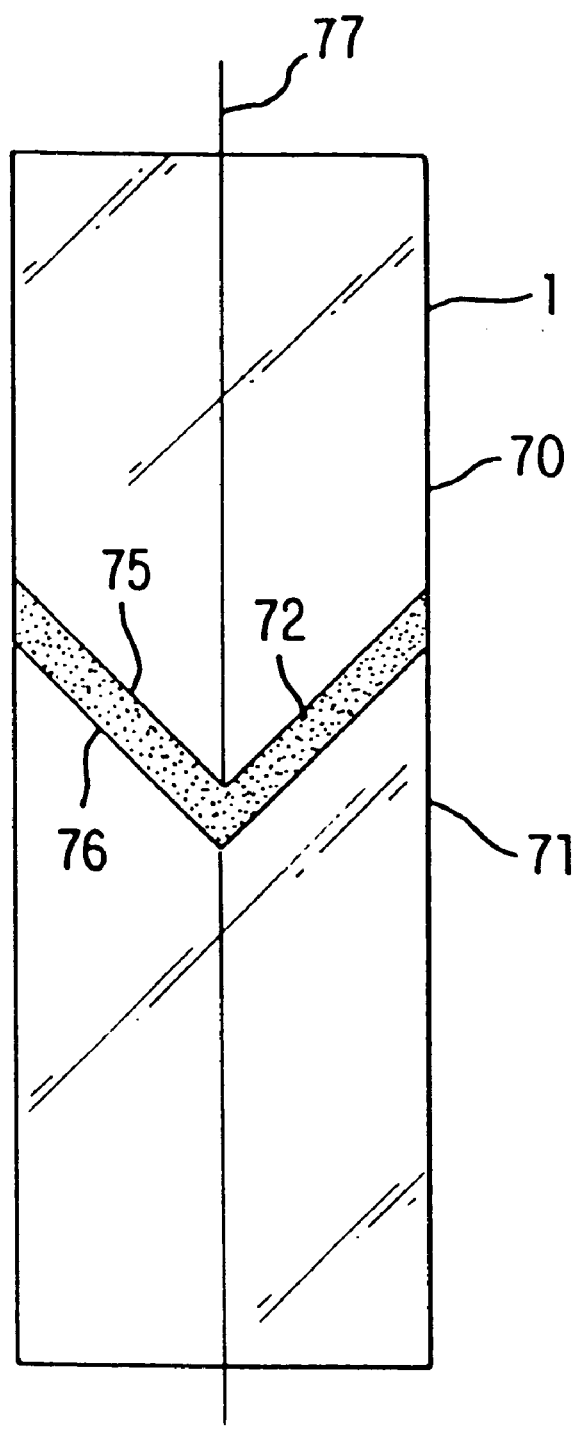

However, the light guides 1 need not be rectangular in cross-section. Indeed, advantages are provided when adjacent ends of adjacent segments 4 of a light guide 1 form other shapes. FIGS. 6A and 6B show such different shapes. Those figures show a portion of a light guide 1 having two adjacent segments 70 and 71, separated by a boundary layer 72. In those figures, the plane of the lowermost edge 75 of segment 70 and the uppermost edge 76 of segment 71 have planar surfaces, but the planar surfaces are not perpendicular to the longitudinal axis 77 of the light guide 1 but have a different shape, e.g. at least one surface is at an oblique angle to the longitudinal axis 77. That shape can be angular, truncated, etc. or even irregular. Such shapes, as opposed to the planar surfaces of edges 75 and 76 being perpendicular to axis 77, cause additional reflections of emitted light within, e.g. segment 70, and, thus, produce increased light absorption by the bulk of the scintillator or by surfaces on the light guide or by the boundary layer 72, and, hence, increases the resolution of which segment emitted the light.

Figure 8A:
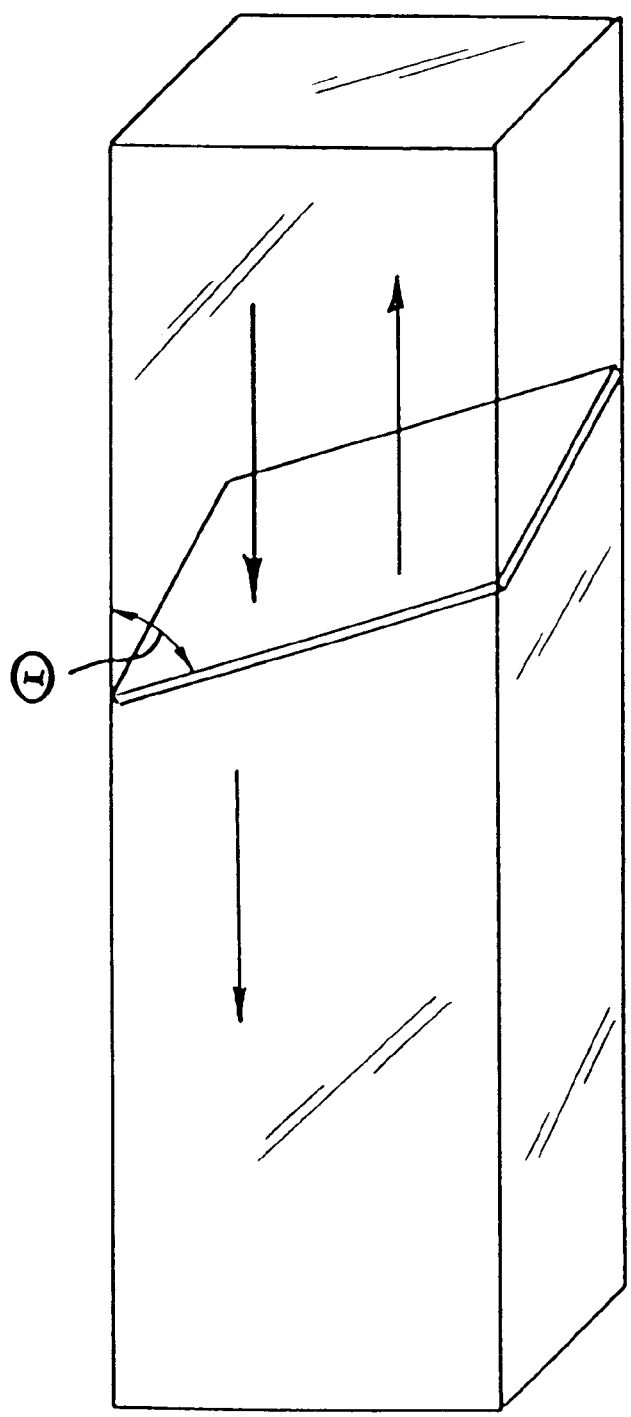
FIGS. 8(a), 8(b) and 8(c) show further embodiments with different configurations of adjacent ends of adjacent segments.

As illustrated in FIG. 8(a), planar surfaces of the segment interfaces, oriented along a plane of a non-perpendicular angle Θ with respect to the longitudinal axis 77 will change the average angle of incidence of the light upon the interface to make it significantly higher than zero degrees. As a result, the net impact will be to increase (decrease) the reflection (transmission) probability of the incident light for a given segment interface to make it a more effective barrier.

Figure 8B:
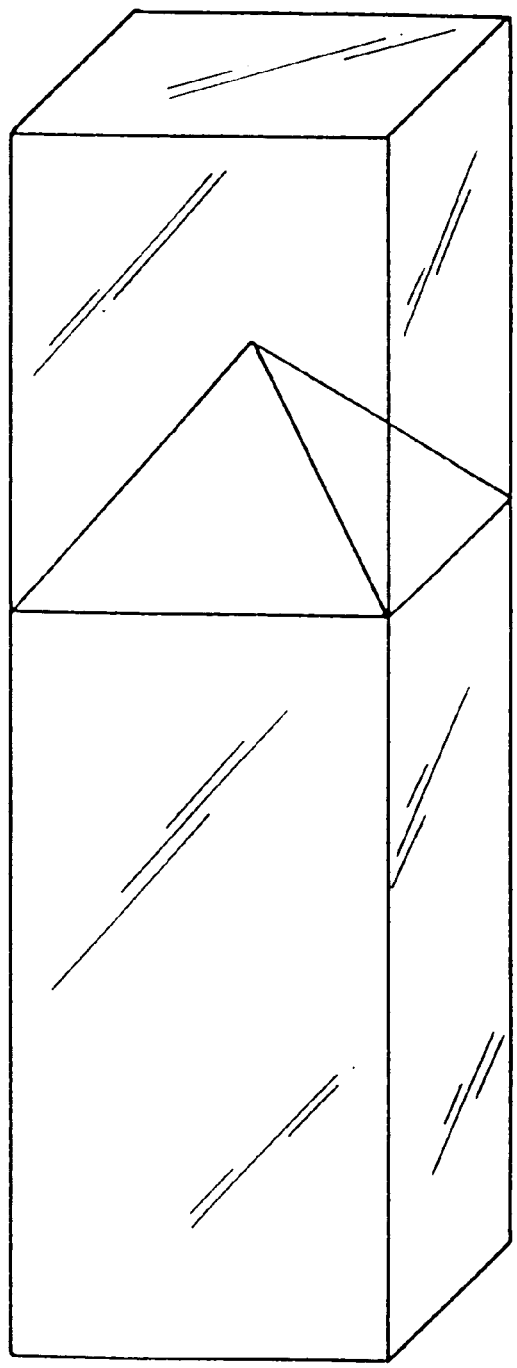
Figure 8C:
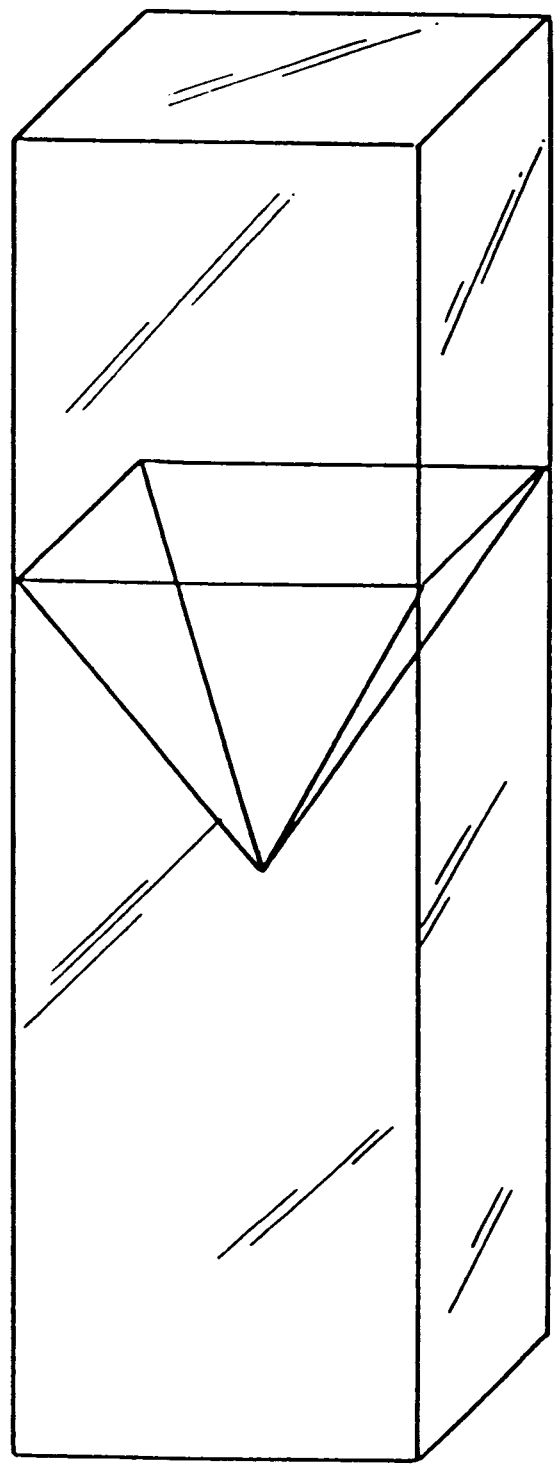

In the same manner, the shape of the interface need not necessarily be planar and may be used to change the average transmission probability through segment interfaces. FIGS. 8(b) and 8(c) illustrate two embodiments using convex (FIG. 8(b)) and concave (FIG. 8(c)) pyramidal interfaces instead of the preferred planar one, e.g. where an end of a segment is composed of a plurality of planar surfaces and/or is irregularly shaped. With the convex pyramidal interface, the situation is similar to that of the angled planar surfaces of the interface of FIG. 8(b) and the light transmission probability from the upper to the lower segment is significantly decreased. On the other hand, the concave surfaces of the interface of FIG. 8(c) will act as a funnel, focusing the light towards the pyramid tip and will increase the light transmission from the upper to the lower segment.

As explained above, the differentiation of emitted light is used to determine the Z position of the emitted light. Any of the conventional techniques may be used to determine the X-Y position. A conventional technique employs an analogto-digital converter (ADC) to integrate the summed charge signal from all of the photodetectors, which yields a digital word measuring the total light detected for each gamma ray. The total-light word is combined with similarly derived ADC words from selected individual pairs of the photodetectors to reference a digital memory from which the digital X and Y coordinates of the excited light guide are read. These X and Y coordinates are routed to another portion of digital memory which records selected ones of them, along with other useful information about the detected photon (such as perhaps its precise time relationship with another photon detected in another detector). From the digital record of many such detected and recorded photons, an image of the unknown object is later reconstructed by a computer. This same technique and apparatus can likewise be used for determining the Z coordinate.

Figure 7:
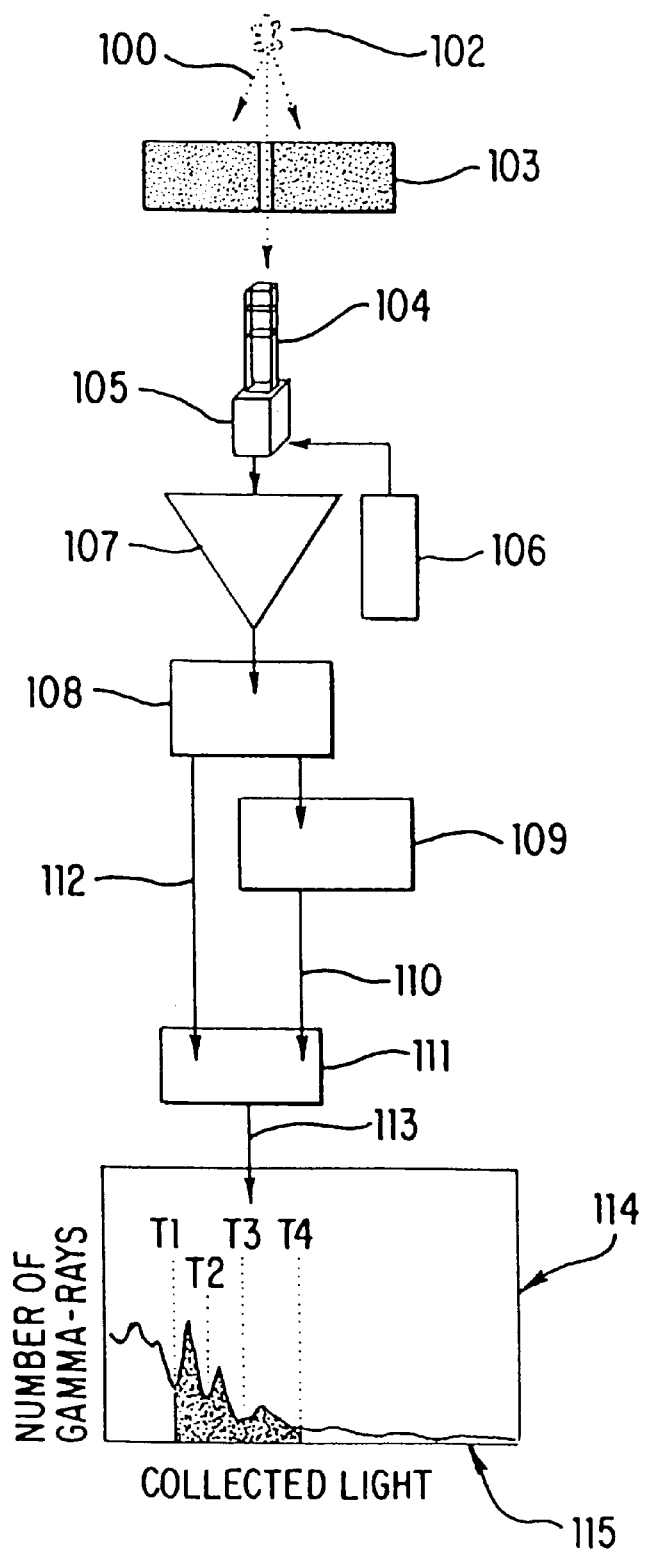
FIG. 7 shows a typical apparatus for preparing a histogram of collected light.

As a typical example of apparatus for forming a histogram of collected emitted light, FIG. 7 shows that annihilation gamma rays 100, with an energy of 511 keV, are first obtained from a radioisotope, such as $^{68}$Ge or $^{22}$Na, encapsulated in a sealed point such as source 102. A slit or pinhole collimator 103, made of a heavy metal such as lead or tungsten, is located in front of the source in order to select only those gamma rays that are emitted in the direction parallel to its aperture. Collimated gamma rays are then impinging onto the receiving end of a stacked scintillator crystal 104.

As previously described, the interactions of these gamma rays in the stacked scintillator crystal induce the emission of light which is then guided to the light transmitting end. The light exits at that end which is optically coupled to the sensitive window of a light sensing device 105, such as a photomultiplier tube or a photodiode, supplied by a power unit 106 providing the voltage appropriate to assure the stable operation of the device. For each interacting gamma ray, the collected light is in this way converted by the light sensing device into a raw voltage or current analog pulse.

The raw analog pulse is subsequently directed to a linear or shaping amplifier 107 which brings its amplitude within the dynamic range necessary for subsequent processing. A fan out or splitter 108 further splits the amplified analog signal in two parallel branches.

The first of these branches feeds a constant fraction discriminator 109 which has the function of issuing a logic pulse if the amplitude of the amplified analog signal from the light sensing device is above a preset minimum value. The minimum is typically chosen so that photon interactions leading to a significant amount of collected light will generate a logic pulse. This type of discriminator also registers the photon interaction in time by issuing its logic pulse when the input analog pulse reaches a constant fraction of its own maximum.

The logic pulse issued by the discriminator is used as an input gate signal 110 to trigger an analog-to-digital converter 111. Upon arrival of a gate signal, this unit converts into a digital value the maximum amplitude, or net electric charge, of the delayed analog pulse 112 at the input to the ADC converter 111 and obtained from the second branch of the fan out or splitter 108. In this way, a digital output signal 113 is acquired, with a value linearly proportional to the amount of light initially collected at the light transmitting end of the stacked scintillator crystal. The digitized collected light value of each photon interaction event is then passed into a local computer memory 114 for further processing.

Such processing may, for instance, conventionally involve the use of the digitized collected light value of a given photon event to increment the proper element of a linear array 115 held in memory. Doing so for a sufficiently large number of events then leads to a histogram of the collected light distribution such as that shown in FIG. 2. This histogram is used to calibrate the response of the stacked scintillator crystal and in particular to find threshold values $T_1, T_2, T_3, T_4, \ldots, T_n, T_{n+1}$ that correspond to the lower and upper limits of the amount of light collected for photon interactions occurring in each of the n distinct segments of the stacked scintillator crystal, with segment number 1 indicating the segment at the receiving end.

These threshold values are kept in memory so as to find in which of the stack segments subsequent photon interactions occur. This is done by associating to segment number X the interaction of photons yielding a digitized collected light that is found to lie between the threshold values $T_x$ and $T_{x+1}$.

EXAMPLE 1

Three individual LSO crystals of the same composition and having an index of refraction of 1.825 were conventionally mechanically polished on all six sides to remove any surface roughness. Each crystal had dimensions of 4 mm by 4 mm by 10 mm and each crystal had been produced from the same LSO production batch.

The 4 mm sides of each crystal were cleaned with acetone to remove any contaminants, e.g. oil, etc.

The 4 mm by 4 mm faces of two of the crystals were entirely coated with a clear room temperature cure epoxy resin having an index of refraction of 1.45 to form a glue line. The coating thickness was between about 0.001 and 0.003 inch.

The three crystals were mounted in a mechanical jig for aligning the three crystals on a single axis (center line) while the crystals are disposed in a vertical direction so as to allow gravity to press the crystals together and maintain the glue line while the epoxy resin is being cured.

The three crystals in the jig were placed in an oven preheated to 50° C. for one hour, which accelerates the curing of the room temperature cure epoxy resin.

After one hour in the oven, the cured crystal stack of the three crystals was removed from the jig and excess epoxy was cleaned from around the glued interfaces of the glued crystals with acetone and a razor blade while the stack was still hot and the epoxy resin was still soft.

A 4 mm by 4 mm piece of black vinyl electrical tape was applied to the receiving end of the crystal stack. The stack was wrapped on its 30 mm sides (three crystals of 10 mm each in the stack) and on the receiving end with virgin Teflon tape with at least 10 wraps of the tape. This leaves the transmitting end unwrapped with the Teflon tape.

To the transmitting end was applied a conventional clear optical coupling grease (Dow Corning Q2-3067) in a thin film.

The transmitting end was then coupled to the entrance window of a HAMAMATSU R877 photomultiplier tube for performance testing, which was conducted with the apparatus as described above. The results were similar to that shown in FIG. 2.

EXAMPLE 2

A LSO crystal having dimensions of 2.5 mm by 2.5 mm by 22 mm (index of refraction 1.825) was conventionally mechanically polished on all six sides.

The crystal was cut with a rotating diamond saw blade of 325 mesh diamond powder into three separate crystals with cuts perpendicular to the crystal axis (center line). The three crystals had height dimensions of, respectively, 2.68 mm, 5.46 mm and 10.68 mm (allowing for the thickness of the diamond saw blade).

Each surface was cleaned with acetone to remove saw and crystal debris. The sawed surfaces were not polished.

Two of the crystals had, at the sawed faces, applied a room temperature cure epoxy resin with an index of refraction of 1.566 (EPO TEK 302, supplied by Epoxy Technology Inc.). The sawed faces were entirely covered with the epoxy resin to form a glue line of about 0.001 to 0.003 inch (0.00254 to 0.00762 cm ) thick.

Thereafter, the three crystals were mounted in the jig, cured in an oven and cleaned of excess epoxy resin, as set forth in Example 1.

A 2.5 mm by 2.5 mm piece of black vinyl electrical tape was applied to the receiving end of the cured crystal stack (applied to the 2.68 mm height crystal face) and then wrapped with Teflon tape, coated with the optical coupling grease and coupled to the photomultiplier tube for performance testing, as stated in Example 1. The results are those of FIG. 2.

As can be seen from the foregoing, the segmented crystal light guide is quite capable of encoding the X, Y and Z positions of a point of photon-induced light emissions when the boundary layer between segments has a light transmission loss such that the light emission from a segment of the light guide can be distinguished. That required loss varies with the variable of the particular scintillator compound, light guide geometry, etc., noted above, but whatever loss is required for a particular combination of those variables, the boundary layer is easily adapted to essentially provide or fine tune that loss.

Almost any discontinuity between adjacent segments can constitute a boundary layer, i.e. either chemical or mechanical, as explained above. To illustrate rather than to limit the boundary layer, aside from those examples provided above, the following may also be used as a boundary layer: an opened mesh of woven or laid fibers, e.g. synthetic, natural or glass fibers; a grated plastic film; strips of translucent or opaque material; transparent solids, e.g. glass, with a variegated surface; plastic film or glass solid sections with a semi-reflective and/or semi-transparent coating; a pattern of at least semi-opaque configurations, e.g. dots, painted on an end of a segment; usual sun reflective coatings for glass used for camera lens and window glass; glass or plastic sections with the form of molded sections for a friction fit and retention of adjacent segments; a single crystal cut but only partially through the cross-section of the crystal with the partial cuts forming the boundary layer, with or without the cuts being filled with another material, as described above, forming part of the boundary layer; a glass or plastic, elongated molded container to receive and secure, in series, the segments with spacers therebetween to form, at least in part, a boundary layer; a glass or plastic, elongated molded frame with separating sections for receiving and securing, in series, the segments with the separating sections forming the boundary layer; foamed-in-place plastics, which may or may not be self-adhering to the segments; and potting resins and plastics which encapsulate spaced-apart segments.

Such wide variety of boundary layers provides wide latitude in forming the segmented light guides and is an important feature of the invention.

Similarly, the mask of the invention can vary widely. As examples of suitable masks, aside from those examples provided above, and by way of illustration and not limitation, the mask may be any of the above-noted boundary layers, with the exception that the light transmission of the mask applied to the receiving end of the light guide should be considerably less than the light transmission of the boundary layer. The boundary layer light transmission, generally, will be up to 30% less than the light transmission of the crystal segments, but the mask applied to the receiving end should have a light transmission at least 50% less than the light transmission of the crystal segments, and more usually at least 75% or 85% or 95% less. In many combinations of the above-described variables, the light transmission of that mask will be about 100% less, i.e. will transmit essentially no light. On the other hand, to fine tune a particular light guide, some light transmission of that mask may be desirable. In such cases, for example, the above-noted mesh of woven or laid fibers may be quite dense and of a dark or black color. This will substantially reduce the light transmission of the mask, but not eliminate the light transmission entirely, e.g. a loss of light transmission of 85%. Also likewise, the glass or plastic sections with the form of molded sections for a friction fit and retention of adjacent segments may also have a section functioning as that mask. When that mask section is molded of plastic filled with carbon black, the light transmission loss of the mask will be quite high, e.g. 98% or 99%. Also similarly, the foamed-in-place plastic, e.g. polyurethane, may contain carbon black when used as that mask and, when applied directly to the receiving end of the uppermost crystal segment, will provide almost 100% loss of light transmission, similar to the black electricians tape noted above. Where substantial light transmission of that mask is desirable for fine tuning a light guide, the grated plastic film may be used as the mask, but where the gratings (the light transmitting portions) are relatively few, so as to produce, for example, a 70% light transmission loss in that mask. of course, for that mask, more easily applied materials to form the mask are preferred, e.g. paints, coatings, films, plastic or glass moldings, tapes and glues.

It will be appreciated that while certain embodiments of the invention have been described above, other embodiments will be equally obvious to those skilled in the art. It is therefore intended that those embodiments be embraced by the spirit and scope of the disclosure.

What is claimed is:

1. In an apparatus for determining the X, Y and Z positions of a point of photon-induced light emission in an array of a plurality of scintillating light guides made of a scintillating compound, said apparatus having at least one photodetector disposed in registry with a light transmitting end of each light guide, and an analyzer for analyzing from signals produced by the photodetector the X and Y coordinates of photon-induced light emissions within the array of light guides, the improvement comprising:

(1) each light guide having a plurality of discrete crystal segments made of substantially the same scintillating compound with each segment adjacently disposed along a common longitudinal axis of the each light guide;

(2) a boundary layer between at least two of the crystal segments, said boundary layer having a light transmission loss such that light emission from a segment of the each light guide can be distinguished, and wherein the boundary layer has an index of refraction different from the index of refraction of the crystal segments; and (3) a discriminator for comparing light values received by the at least one photodetector to determine which crystal segment of the each light guide emitted the photon-induced light and thus determining a Z coordinate thereof.

2. The apparatus of claim 1, wherein the light guides have at least three segments.

3. The apparatus of claim 2, wherein the loss of light through the boundary layer itself is at least 1.2%.

4. The apparatus of claim 1, wherein the loss of light effected by the boundary layer is at least equal to an intrinsic fractional energy resolution of the scintillator compound when measured with photons of given energy.

5. The apparatus of claim 4, wherein a photon receiving end of the light guide has a light absorbing mask at least partially disposed thereon.

6. The apparatus of claim 5, wherein the light adsorbing mask is essentially totally disposed over the receiving end.

7. The apparatus of claim 1, wherein the index of refraction of the boundary layer is less than the index of refraction of the crystal segments.

8. The apparatus of claim 1, wherein each segment has a height such that there is an equal probability for photon-induced light emitting from each segment.

9. The apparatus of claim 1, wherein each segment has the same height.

10. The apparatus of claim 1, wherein the boundary layer contains a light absorbent or a light reflectant.

11. The apparatus of claim 1, wherein the boundary layer is a glue and adheres the segments together.

12. A scintillating light guide for determining the X, Y and Z positions of a point of photon-induced light emission, comprising:

(1) a plurality of discrete crystal segments made of substantially the same scintillating compound with each segment being adjacently disposed along a common longitudinal axis of the light guide; and (2) a boundary layer between at least two adjacent crystal segments, said boundary layer having a light transmission loss such that light emissions from a segment of the light guide can be distinguished, and wherein the boundary layer has an index of refraction different from the index of refraction of the crystal segments.

13. The light guide of claim 12, wherein adjacent ends of adjacent segments have surfaces not in a perpendicular plane with respect to a longitudinal axis of the light guide.

14. The light guide of claim 13, wherein adjacent segments have planar surfaces.

15. The light guide of claim 14, wherein an end of a segment is composed of a plurality of planar surfaces.

16. The light guide of claim 14, wherein the end of a segment is irregularly shaped.

17. The light guide of claim 13, wherein at least one planar surface is at an oblique angle to the longitudinal axis.

18. The light guide of claim 12 wherein the light guides have at least three segments.

19. The light guide of claim 12, wherein the loss of light effected by the boundary layer is at least equal to an intrinsic fractional energy resolution of the scintillator compound when measured with photons of a given energy.

20. The light guide of claim 12, wherein the loss of light through the boundary layer is at least 1.2%.

21. The light guide of claim 20, wherein a photon receiving end has a light absorbing mask at least partially disposed thereon.

22. The light guide of claim 21, wherein the light adsorbing mask is essentially totally disposed over the receiving end.

23. The light guide of claim 12, wherein the index of refraction of the boundary layer is less than the index of refraction of the crystal segments.

24. The light guide of claim 12, wherein each segment has a height such that there is an equal probability for photon-induced light emitting from each segment.

25. The light guide of claim 12, wherein each segment has the same height.

26. The light guide of claim 12, wherein the boundary layer contains a light absorbent or a light reflectant.

27. The light guide of claim 12, wherein the boundary layer is a glue and adheres the segments together.

* * * * *